US011642857B2

(12) United States Patent
Chau et al.

(10) Patent No.: US 11,642,857 B2
(45) Date of Patent: May 9, 2023

(54) FLUIDIC ACTUATOR MANUFACTURING METHOD

(71) Applicant: Roam Robotics Inc., San Francisco, CA (US)

(72) Inventors: James Chau, Redwood City, CA (US); Linus Park, San Francisco, CA (US); Timothy Alan Swift, Walnut Creek, CA (US)

(73) Assignee: Roam Robotics Inc., San Francisco, CA (US)

( * ) Notice: Subject to any disclaimer, the term of this patent is extended or adjusted under 35 U.S.C. 154(b) by 0 days.

(21) Appl. No.: 17/185,803

(22) Filed: Feb. 25, 2021

(65) Prior Publication Data
US 2021/0260834 A1    Aug. 26, 2021

Related U.S. Application Data

(60) Provisional application No. 63/058,825, filed on Jul. 30, 2020, provisional application No. 63/030,586, (Continued)

(51) Int. Cl.
*B29C 65/00* (2006.01)
*B29C 65/62* (2006.01)
(Continued)

(52) U.S. Cl.
CPC .............. *B29C 65/62* (2013.01); *A61H 3/00* (2013.01); *B25J 9/0006* (2013.01); *B25J 9/142* (2013.01);
(Continued)

(58) Field of Classification Search
CPC ......... B29C 65/94; B29C 65/08; B29C 65/46; B29C 65/48; B29C 65/62; B29C 65/72; (Continued)

(56) References Cited

U.S. PATENT DOCUMENTS 440,684 A     11/1890  Yagn
3,823,711 A    7/1974  Hatton
(Continued)

FOREIGN PATENT DOCUMENTS

CN     101151071 A     3/2008
CN     103412003 A    11/2013
(Continued)

OTHER PUBLICATIONS

China Search Report for Application No. 201880056518.3 dated Jul. 4, 2022, 4 pages.
(Continued)

*Primary Examiner* — Philip C Tucker
*Assistant Examiner* — Nickolas R Harm
(74) *Attorney, Agent, or Firm* — Davis Wright Tremaine LLP

(57) ABSTRACT

A method of constructing an inflatable fluidic actuator that includes generating a tube configuration with one or more shapes of fluid-impermeable membrane material, the tube configuration having a first tube end and a second tube end and an internal tube face and an external tube face. The method also includes coupling a first and second interface to the tube configuration at the first and second tube ends by respectively coupling each interface to the tube configuration at a respective tube end by generating at least one of: a first circumferential bond between the fluid-impermeable membrane material and one or more sidewalls of the interface; and an external face bond between fluid-impermeable membrane material at the tube end onto an external face of the interface.

20 Claims, 21 Drawing Sheets

Related U.S. Application Data filed on May 27, 2020, provisional application No. 62/981,141, filed on Feb. 25, 2020.

(51) Int. Cl.

| | | |
|---|---|---|
| *A61H 3/00* | (2006.01) | |
| *B29C 65/04* | (2006.01) | |
| *B29C 65/48* | (2006.01) | |
| *B25J 9/00* | (2006.01) | |
| *B25J 9/14* | (2006.01) | |
| *B29L 31/00* | (2006.01) | |
| *B29K 669/00* | (2006.01) | |
| *B29K 675/00* | (2006.01) | |
| *B29C 65/78* | (2006.01) | |
| *B29C 65/46* | (2006.01) | |
| *B29C 65/72* | (2006.01) | |
| *B29C 65/08* | (2006.01) | |

(52) U.S. Cl.
CPC .............. *B29C 65/04* (2013.01); *B29C 65/48* (2013.01); *B29C 66/02241* (2013.01); *B29C 66/5346* (2013.01); *B29C 66/729* (2013.01); *B29C 66/7392* (2013.01); *A61H 2003/007* (2013.01); *A61H 2201/1238* (2013.01); *A61H 2201/1642* (2013.01); *B29C 65/08* (2013.01); *B29C 65/46* (2013.01); *B29C 65/72* (2013.01); *B29C 65/7832* (2013.01); *B29C 65/7838* (2013.01); *B29C 66/022* (2013.01); *B29C 66/0382* (2013.01); *B29C 66/0384* (2013.01); *B29C 66/4322* (2013.01); *B29C 66/4326* (2013.01); *B29C 66/4329* (2013.01); *B29C 66/4332* (2013.01); *B29C 66/5324* (2013.01); *B29C 66/53245* (2013.01); *B29C 66/53246* (2013.01); *B29C 66/53247* (2013.01); *B29C 66/61* (2013.01); *B29C 66/612* (2013.01); *B29C 66/721* (2013.01); *B29C 66/7292* (2013.01); *B29C 66/73175* (2013.01); *B29K 2669/00* (2013.01); *B29K 2675/00* (2013.01); *B29L 2031/753* (2013.01)

(58) Field of Classification Search
CPC ............ B29C 65/7832; B29C 65/7838; B29C 66/022; B29C 66/038; B29C 66/0382; B29C 66/0384; B29C 66/4322; B29C 66/4332; B29C 66/4326; B29C 66/4329; B29C 66/5324; B29C 66/53245; B29C 66/53246; B29C 66/53247; B29C 66/5344; B29C 66/61; B29C 66/612; B29C 66/721; B29C 66/729; B29C 66/7292; B29C 66/73175
See application file for complete search history.

(56) References Cited

U.S. PATENT DOCUMENTS

| | | |
|---|---|---|
| 3,868,952 A | 3/1975 | Hatton |
| 3,982,531 A | 9/1976 | Shaffer |
| 3,993,056 A | 11/1976 | Rabischong et al. |
| 4,274,399 A | 6/1981 | Mummert |
| 4,523,582 A | 6/1985 | Barber |
| 4,671,258 A | 6/1987 | Barthlome |
| 4,944,755 A | 7/1990 | Hennequin et al. |
| 5,033,457 A | 7/1991 | Bonutti |
| 5,483,838 A | 1/1996 | Holden |
| 5,780,123 A * | 7/1998 | Kamiyama .............. B29C 65/62 |
| | | 428/36.1 |
| 6,117,507 A * | 9/2000 | Smith ...................... B29C 63/34 |
| | | 156/287 |
| 6,612,340 B1 * | 9/2003 | Lause ................. F16L 55/1656 |
| | | 138/97 |
| 6,776,769 B2 | 8/2004 | Smith |
| 7,086,322 B2 | 8/2006 | Schulz |
| 7,479,121 B2 | 1/2009 | Branch |
| 7,628,766 B1 | 12/2009 | Kazerooni et al. |
| 8,171,570 B2 | 5/2012 | Adarraga |
| 8,784,350 B2 | 7/2014 | Cohen |
| 9,205,560 B1 | 12/2015 | Edsinger et al. |
| 9,709,206 B2 * | 7/2017 | Duttenhoefer ............ B32B 3/18 |
| 9,821,475 B1 | 11/2017 | Lynn et al. |
| 9,827,667 B2 | 11/2017 | Griffith et al. |
| 9,995,321 B2 | 6/2018 | Lynn et al. |
| 10,012,229 B2 | 7/2018 | Lynn et al. |
| 10,245,204 B2 | 4/2019 | Sandler et al. |
| 10,543,110 B2 | 1/2020 | Piercy et al. |
| 10,562,180 B2 | 2/2020 | Telleria et al. |
| 10,605,365 B1 | 3/2020 | Griffith et al. |
| 10,611,020 B2 | 4/2020 | Griffith et al. |
| 10,619,633 B2 | 4/2020 | Lynn et al. |
| 10,780,012 B2 | 9/2020 | Lamb et al. |
| 10,966,895 B2 | 4/2021 | Lamb et al. |
| 11,033,450 B2 | 6/2021 | Lamb et al. |
| 11,259,979 B2 | 3/2022 | Swift et al. |
| 11,351,083 B2 | 6/2022 | Swift et al. |
| 2001/0029343 A1 | 10/2001 | Seto et al. |
| 2002/0026794 A1 | 3/2002 | Shahinpoor et al. |
| 2004/0010720 A1 | 1/2004 | Singh et al. |
| 2005/0066810 A1 | 3/2005 | Schulz |
| 2005/0102863 A1 * | 5/2005 | Hannon .................. A43B 7/125 |
| | | 36/57 |
| 2006/0069336 A1 | 3/2006 | Krebs et al. |
| 2006/0161220 A1 | 7/2006 | Kobayashi et al. |
| 2006/0173552 A1 | 8/2006 | Roy |
| 2006/0207726 A1 * | 9/2006 | Driver ..................... B29C 53/50 |
| | | 156/433 |
| 2007/0042710 A1 | 2/2007 | Mahini et al. |
| 2007/0075543 A1 * | 4/2007 | Marx ................. B29C 66/12441 |
| | | 285/903 |
| 2008/0009771 A1 | 1/2008 | Perry et al. |
| 2008/0161937 A1 | 7/2008 | Sankai |
| 2008/0195005 A1 | 8/2008 | Horst et al. |
| 2008/0234608 A1 | 9/2008 | Sankai |
| 2008/0287850 A1 | 11/2008 | Adarraga |
| 2010/0114329 A1 | 5/2010 | Casler et al. |
| 2010/0204627 A1 | 8/2010 | Kazerooni et al. |
| 2010/0249675 A1 | 9/2010 | Fujimoto et al. |
| 2010/0270771 A1 | 10/2010 | Kobayashi et al. |
| 2010/0280424 A1 | 11/2010 | Kawakami et al. |
| 2011/0071417 A1 | 3/2011 | Liu et al. |
| 2011/0099026 A1 | 4/2011 | Oakley et al. |
| 2011/0105966 A1 | 5/2011 | Kazerooni et al. |
| 2011/0118635 A1 | 5/2011 | Yamamoto |
| 2011/0186208 A1 * | 8/2011 | Cartabbia ......... B29C 66/12861 |
| | | 156/263 |
| 2011/0290798 A1 * | 12/2011 | Corbett ................. B29C 66/131 |
| | | 220/62.12 |
| 2012/0059291 A1 | 3/2012 | Nguyen |
| 2012/0289870 A1 | 11/2012 | Hsiao-Wecksler et al. |
| 2012/0328824 A1 * | 12/2012 | Cartabbia ........... B29C 65/5092 |
| | | 156/499 |
| 2013/0150980 A1 | 6/2013 | Swift et al. |
| 2013/0158445 A1 | 6/2013 | Kazerooni et al. |
| 2013/0245512 A1 | 9/2013 | Goffer et al. |
| 2013/0289452 A1 | 10/2013 | Smith et al. |
| 2014/0109560 A1 | 4/2014 | Ilievski et al. |
| 2014/0207037 A1 | 7/2014 | Horst |
| 2014/0212243 A1 | 7/2014 | Yagi et al. |
| 2014/0276264 A1 | 9/2014 | Caires et al. |
| 2014/0277739 A1 | 9/2014 | Kornbluh et al. |
| 2014/0318118 A1 | 10/2014 | Mazzeo et al. |
| 2015/0088043 A1 | 3/2015 | Goldfield et al. |
| 2015/0126911 A1 | 5/2015 | Abramowicz et al. |
| 2015/0173993 A1 | 6/2015 | Walsh et al. |
| 2015/0209214 A1 | 7/2015 | Herr et al. |
| 2015/0285238 A1 | 10/2015 | Lynn et al. |
| 2015/0290794 A1 | 10/2015 | Griffith et al. |
| 2015/0351995 A1 | 12/2015 | Zoss et al. |
| 2016/0082319 A1 | 3/2016 | Macri et al. |

(56) References Cited

U.S. PATENT DOCUMENTS

| | | | |
|---|---|---|---|
| 2016/0107309 A1 | 4/2016 | Walsh et al. |
| 2016/0158087 A1 | 6/2016 | Huang et al. |
| 2016/0213548 A1 | 7/2016 | John et al. |
| 2016/0242986 A1 | 8/2016 | Nagata et al. |
| 2016/0242987 A1 | 8/2016 | Nagata et al. |
| 2016/0252110 A1 | 9/2016 | Galloway et al. |
| 2016/0261224 A1 | 9/2016 | Madrone et al. |
| 2016/0278948 A1 | 9/2016 | Piercy et al. |
| 2016/0297504 A1 | 10/2016 | Saindon et al. |
| 2016/0300156 A1 | 10/2016 | Bowers et al. |
| 2016/0331557 A1 | 11/2016 | Tong et al. |
| 2016/0331624 A1 | 11/2016 | Sankai et al. |
| 2016/0346156 A1 | 12/2016 | Walsh et al. |
| 2017/0049587 A1 | 2/2017 | Herr et al. |
| 2017/0202725 A1 | 7/2017 | Robertson et al. |
| 2017/0282360 A1 | 10/2017 | Telleria et al. |
| 2018/0079071 A1 | 3/2018 | Griffith et al. |
| 2018/0086178 A1 | 3/2018 | Stanek et al. |
| 2018/0125152 A1 | 5/2018 | Bruel |
| 2018/0221237 A1 | 8/2018 | Swift et al. |
| 2018/0235830 A1 | 8/2018 | Rokosz et al. |
| 2018/0283414 A1 | 10/2018 | Lynn et al. |
| 2018/0296425 A1 | 10/2018 | Lamb et al. |
| 2019/0015233 A1 | 1/2019 | Galloway et al. |
| 2019/0029918 A1 | 1/2019 | Inada et al. |
| 2019/0060156 A1 | 2/2019 | Swift et al. |
| 2019/0060157 A1 | 2/2019 | Lamb et al. |
| 2019/0283235 A1 | 9/2019 | Nam et al. |
| 2019/0293223 A1* | 9/2019 | Free | B29C 65/5042 |
| 2019/0307583 A1 | 10/2019 | Herr et al. |
| 2019/0328604 A1 | 10/2019 | Contreras-Vidal et al. |
| 2019/0383313 A1 | 12/2019 | Fowler et al. |
| 2020/0114588 A1* | 4/2020 | Wang | B29C 66/7232 |
| 2020/0253808 A1 | 8/2020 | Swift et al. |

FOREIGN PATENT DOCUMENTS

| | | |
|---|---|---|
| CN | 104582668 A | 4/2015 |
| CN | 105205436 A | 12/2015 |
| CN | 204814712 U | 12/2015 |
| CN | 105264255 A | 1/2016 |
| CN | 105590409 A | 5/2016 |
| CN | 105816301 A | 8/2016 |
| CN | 105992554 A | 10/2016 |
| CN | 106029039 A | 10/2016 |
| CN | 106137489 A | 11/2016 |
| CN | 106413998 A | 2/2017 |
| CN | 106420279 A | 2/2017 |
| CN | 111135031 A | 5/2020 |
| CN | 111278398 A | 6/2020 |
| DE | 102011107580 A1 | 1/2013 |
| EP | 2827809 A1 | 1/2015 |
| EP | 3173191 A2 | 5/2017 |
| FR | 1463850 A | 7/1966 |
| JP | S62501723 A | 7/1987 |
| JP | S63199965 A | 8/1988 |
| JP | 2000051289 A | 2/2000 |
| JP | 2006000347 A | 1/2006 |
| JP | 2007282991 A | 11/2007 |
| JP | 2012501739 A | 1/2012 |
| JP | 3179088 U | 10/2012 |
| JP | 2012532001 | 12/2012 |
| JP | 2015008938 A | 1/2015 |
| JP | 2015089386 A | 5/2015 |
| JP | 2016137146 | 8/2016 |
| JP | 2020518295 A | 6/2020 |
| KR | 10-2008-0048450 A | 6/2008 |
| SU | 251758 | 11/1970 |
| WO | 8603816 A1 | 7/1986 |
| WO | 9722782 A1 | 6/1997 |
| WO | 0004852 A1 | 2/2000 |
| WO | 2009081710 A1 | 7/2009 |
| WO | 2011043095 A1 | 4/2011 |
| WO | 2013142777 A1 | 9/2013 |
| WO | 2013152929 A1 | 10/2013 |
| WO | 2015080596 A1 | 6/2015 |
| WO | 2015104832 A1 | 7/2015 |
| WO | 2016166442 A1 | 10/2016 |
| WO | 2016166588 A1 | 10/2016 |
| WO | 2016207855 A1 | 12/2016 |
| WO | 2017110453 A1 | 6/2017 |
| WO | 2018218336 A1 | 12/2018 |
| WO | 2019183397 A1 | 9/2019 |
| WO | 2019187030 A1 | 10/2019 |

OTHER PUBLICATIONS

European Patent Office Communication Under Rule 71(3) EPC, Application No. 18 783 814.9 dated Aug. 11, 2022, 44 pages.

Huang et al., "Interactive learning for sensitivity factors of a human-powered augmentation lower exoskeleton," 2015 IEEE/RSJ International Conference on Intelligent Robots and Systems (IROS), Sep. 28, 2015, 7 pages.

International Search Report and Written Opinion dated Apr. 26, 2018, International Patent Application No. PCT/US2018/016729, filed Feb. 2, 2018, 7 pages.

International Search Report and Written Opinion dated Aug. 26, 2021, Patent Application No. PCT/US2021/034444, 7 pages.

International Search Report and Written Opinion dated Aug. 26, 2021, Patent Application No. PCT/US2021/034447, 7 pages.

International Search Report and Written Opinion dated Aug. 26, 2021, Patent Application No. PCT/US2021/034593, 10 pages.

International Search Report and Written Opinion dated Dec. 6, 2018, International Patent Application No. PCT/US2018/048638, filed Aug. 29, 2018, 8 pages.

International Search Report and Written Opinion dated Dec. 6, 2018, Patent Application No. PCT/US2018/048639, 7 pages.

International Search Report and Written Opinion dated Jul. 18, 2016, International Patent Application No. PCT/US2016/024366, filed Mar. 25, 2016, 7 pages.

International Search Report and Written Opinion dated Jul. 19, 2018, International Patent Application No. PCT/US2018/027643, filed Apr. 13, 2018, 7 pages.

International Search Report and Written Opinion dated Jun. 3, 2021, Patent Application No. PCT/US2021/019711, 12 pages.

International Search Report and Written Opinion dated Mar. 30, 2021, Patent Application No. PCT/US2020/064647, 10 pages.

International Search Report and Written Opinion dated Sep. 2, 2021, Patent Application No. PCT/US2021/034030, 9 pages.

International Search Report and Written Opinion dated Sep. 2, 2021, Patent Application No. PCT/US2021/034450, 9 pages.

International Search Report and Written Opinion dated Sep. 9, 2021, Patent Application No. PCT/US2021/034443, 8 pages.

International Search Report and Written Opinion dated Sep. 9, 2021, Patent Application No. PCT/US2021/034579, 8 pages.

International Search Report and Writtent Opinion dated Aug. 26, 2021, Patent Application No. PCT/US2021/034468, 8 pages.

Tamez-Duque et al., "Real-time strap pressure sensor system for powered exoskeletons," Sensors 15(2):4550-4563, Feb. 2015.

Taniguchi, "Flexible Artificial Muscle Actuator Using Coiled Shape 5 Memory Alloy Wires," APCBEE Procedia 7:54-59, Jan. 1, 2013.

Chinese Patent Office Second Office Action and Supplementary Search Report dated Apr. 25, 2022; Application No. 201880023218.5; 15 pages.

Chinese Patent Office Second Office Action and Supplementary Search Report dated Mar. 30, 2022; Application No. 201880024598; 15 pages.

Chinese Patent Office Second Office Action dated Jul. 13, 2022; Application No. 201880056518.3; 6 pages.

European Patent Office Communication under Rule 71(3) EPC dated Apr. 19, 2022, Application No. 18 850 236.3, 46 pages.

European Patent Office Extended Search Report dated Oct. 18, 2022, Patent Application No. 22181044.3-1122, 7 pages.

Israel Notice of Deficiencies for Patent Application No. 269860 dated Jul. 25, 2022, 5 pages.

Japan Final Rejection of Application No. 2019-563328 dated Jul. 6, 2022, 2 pages.

(56) References Cited

OTHER PUBLICATIONS

Japan Patent Office, "Final Rejection" in Applicaiton No. 2019-563328, dated Sep. 9, 2022, 4 pages.
Japanese IPO Final Rejection of Application No. 2019-563328, dated Aug. 9, 2022, 2 pages.
Japanese IPO Notification of Reason for Rejection of Application No. 2020-512042, dated Jun. 27, 2022, 2 pages.
National Intellectual Property Administration, P. R. China, "2nd Office Action" in Application No. 201880023218.5, dated Apr. 25, 2022, 15 pages.
Notification of Grant of Chinese Patent Application No. 201880056709 dated May 18, 2022, 2 pages.
Chinese Patent Office Decision of Rejection dated Oct. 10, 2022; Application No. 201880024597; 11 pages.
European Patent Office Notice of Intention to Grant, Application No. 18783814.9, dated Nov. 29, 2022, 8. pages.
Japan Final Office Action and Decision to Reject Amendment of Application No. 2019-554877 dated Nov. 7, 2022, 4 pages.
Chinese Patent Office Notification to Grant Patent Right for Invention dated Nov. 4, 2022; Application No. 201880056518.3; 2 pages.
Chinese Patent Office Decision on Rejection dated Oct. 10, 2022; Application No. 201880024597; 11 pages.
European Patent Office Intention to Grant, Application No. 18 783 814.9 dated Nov. 29, 2022, 83 pages.
Israel Notice of Acceptance for Patent Application No. 272621 dated Dec. 22, 2022, 4 pages.
Israel Notice of Deficiencies for Patent Application No. 272623 dated Dec. 7, 2022, 4 pages.
Israel Notice of Deficiencies for Patent Application No. 282165 dated Dec. 18, 2022, 4 pages.
Japan Decision to Grant Application No. 2020-512042 dated Jan. 13, 2023, 2 pages.

\* cited by examiner

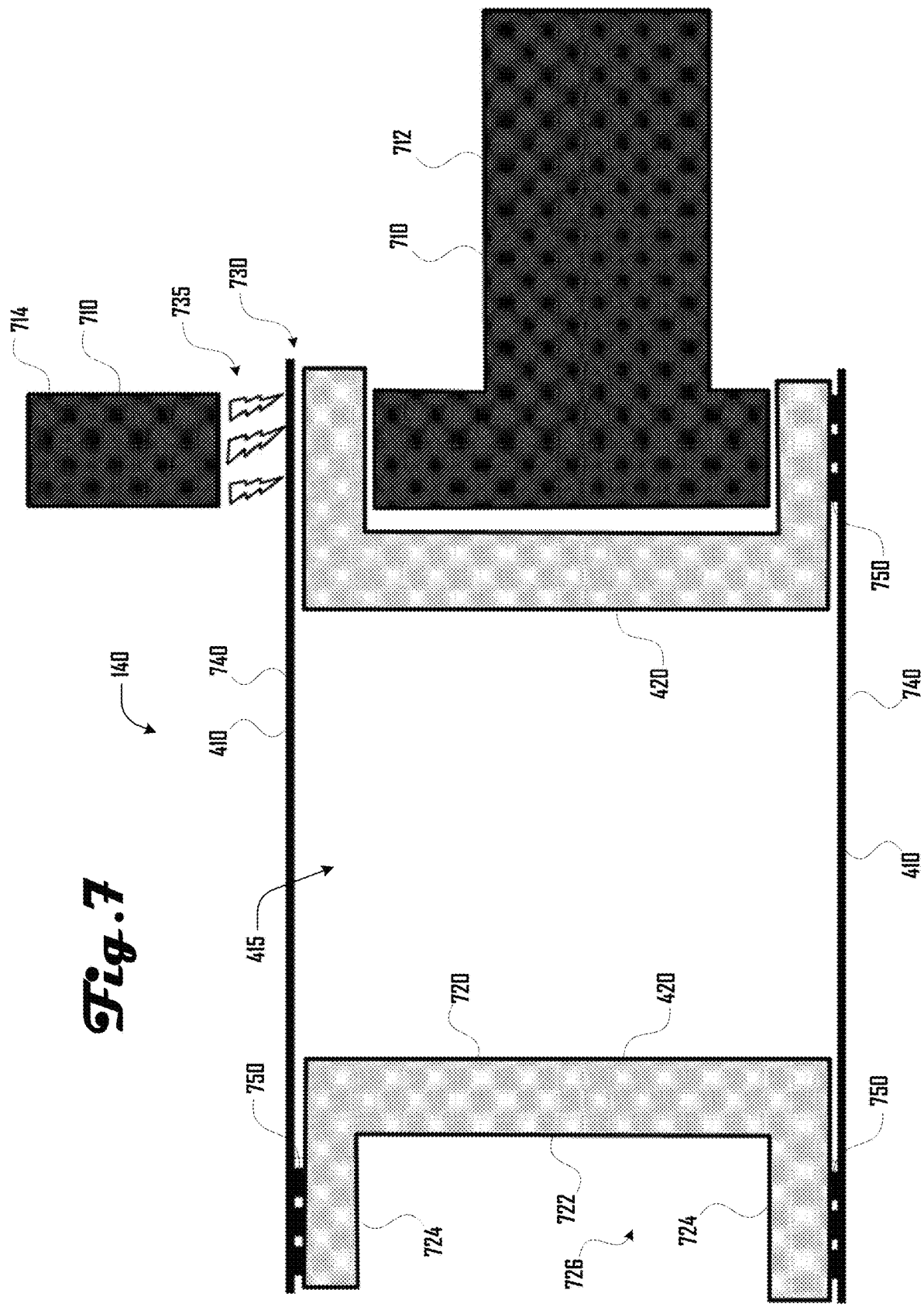

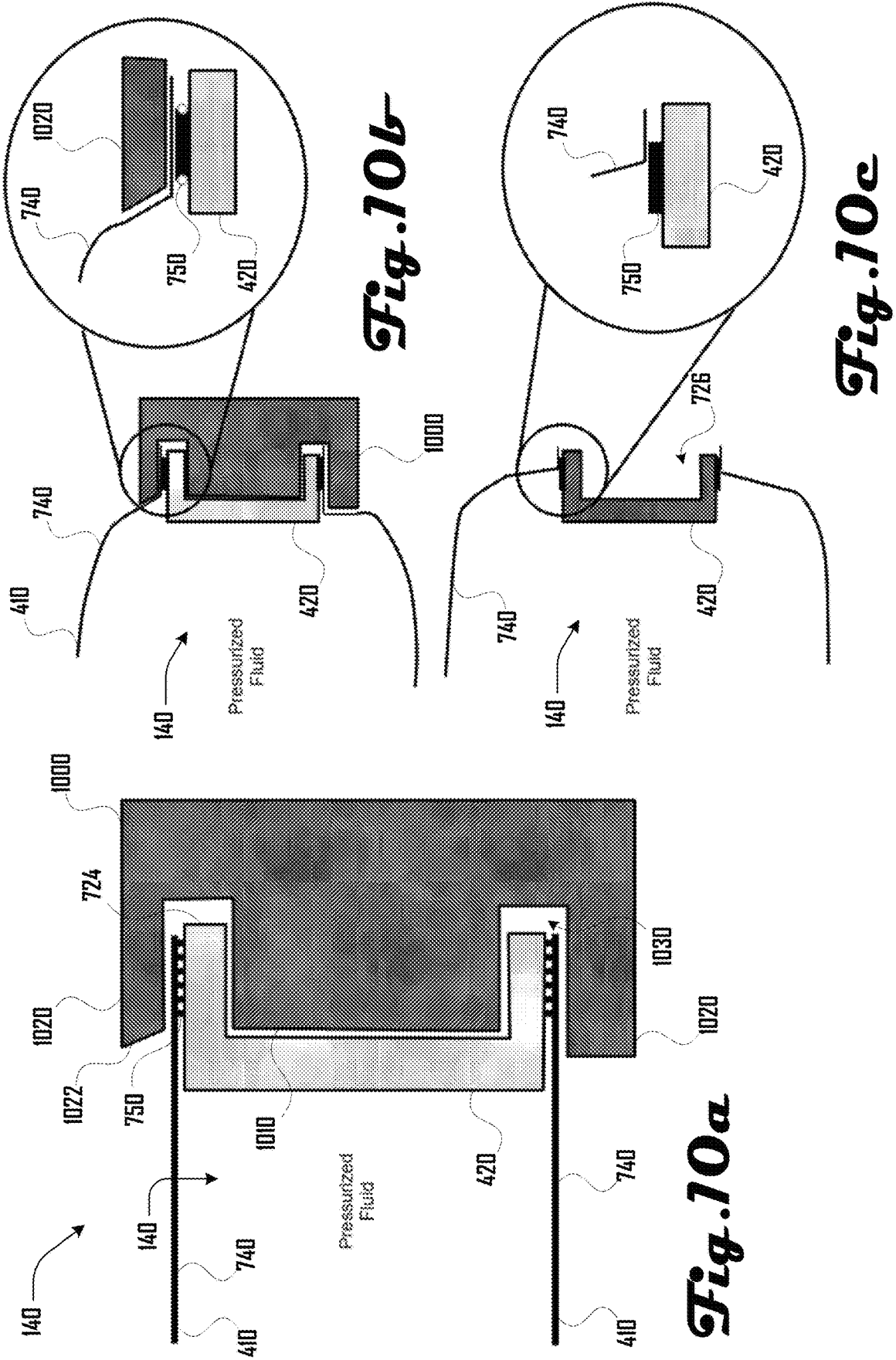

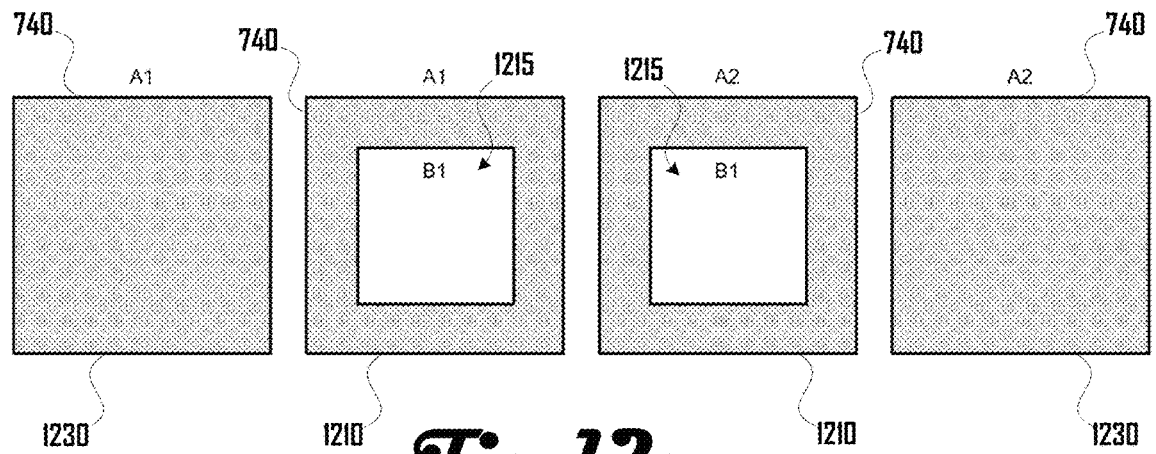
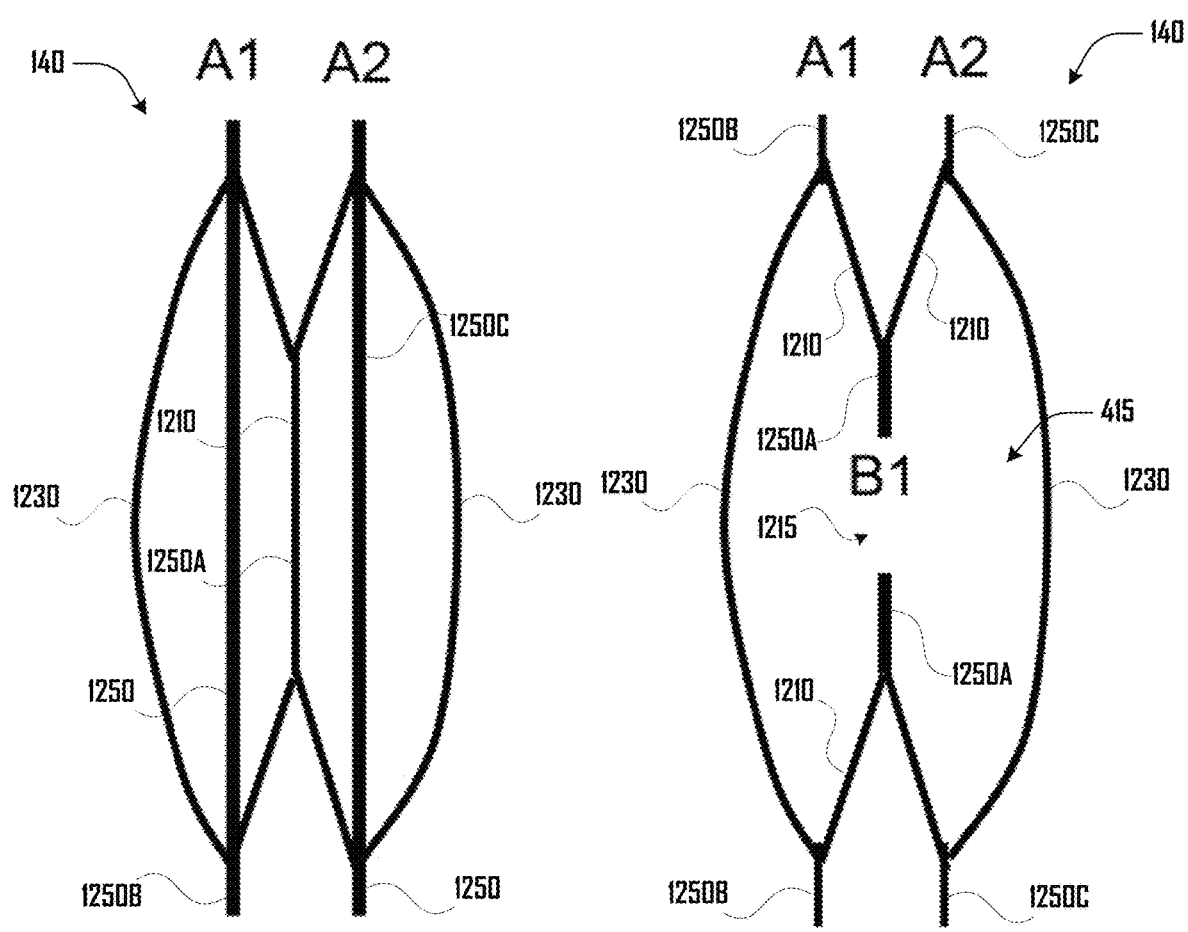

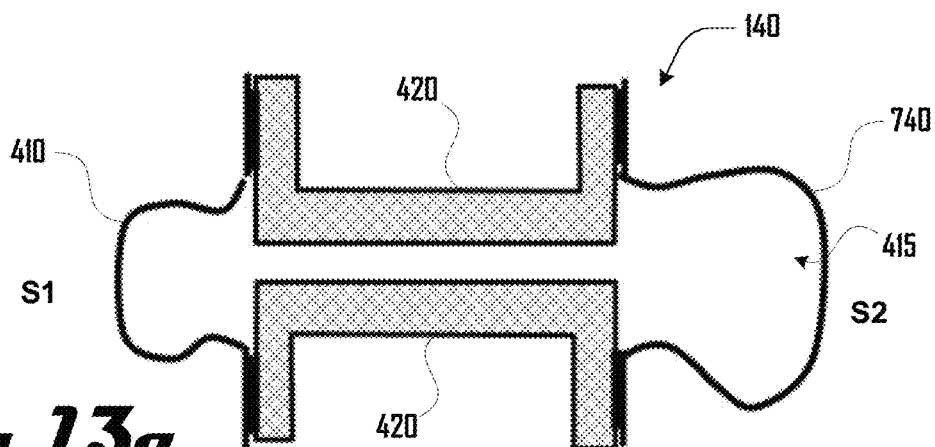
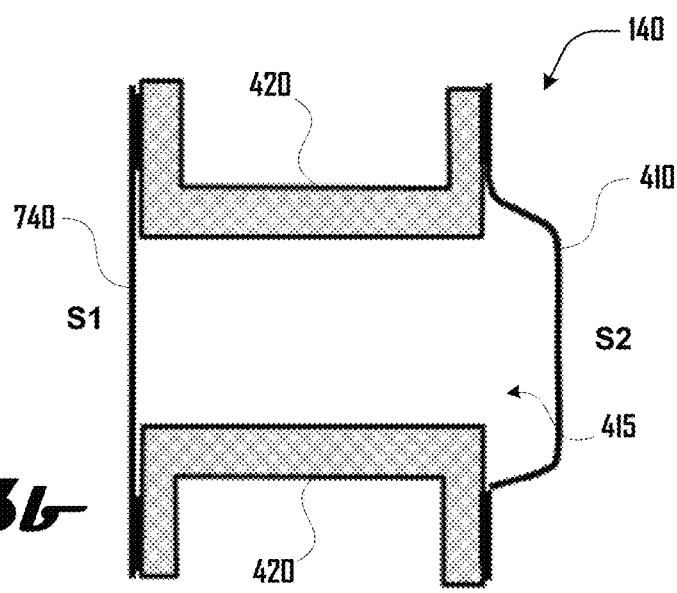
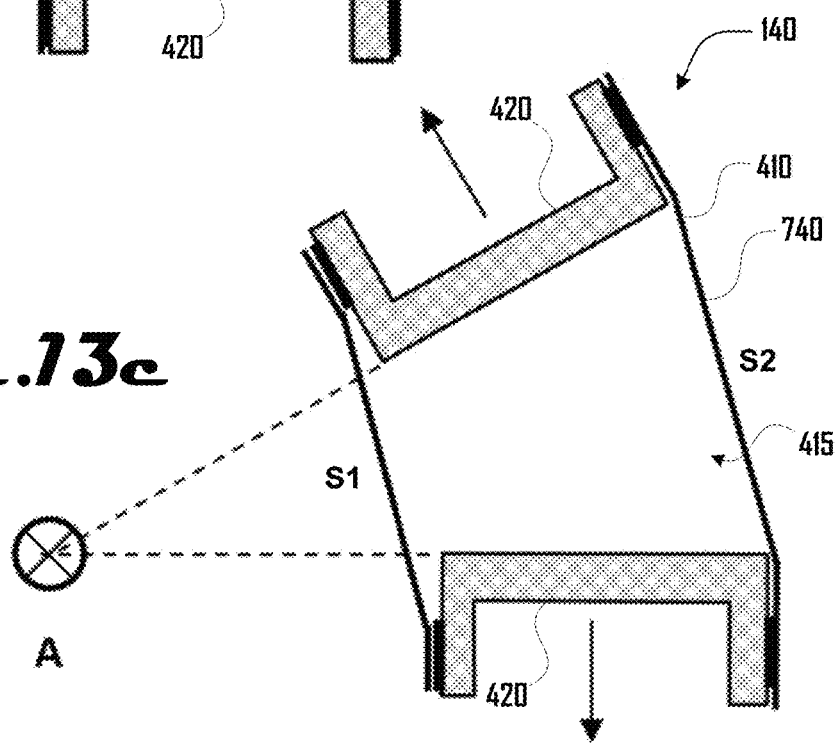

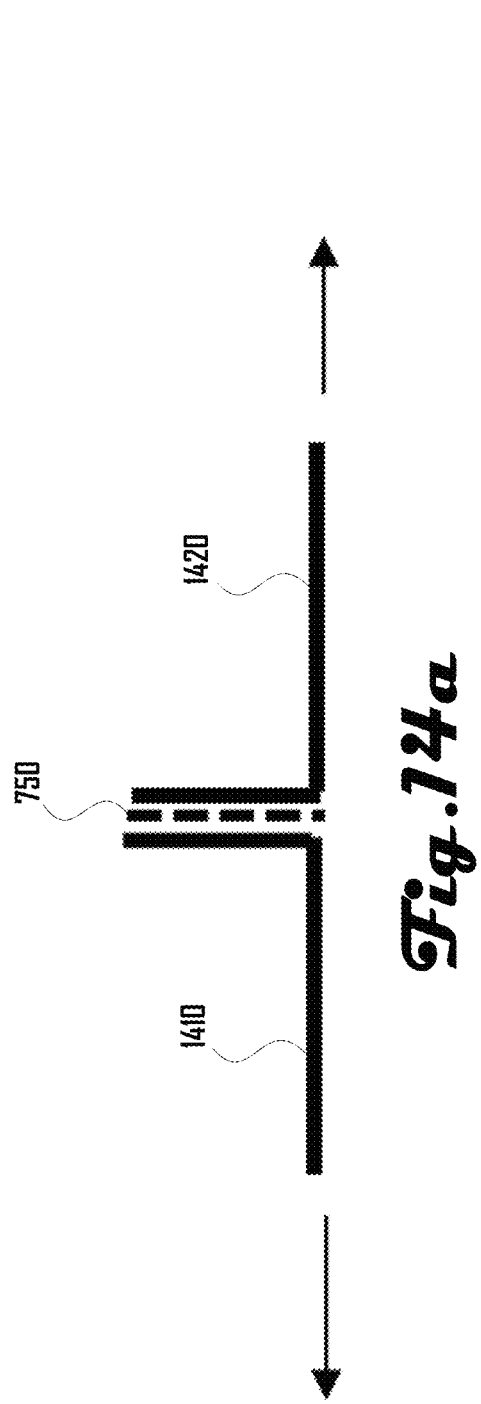
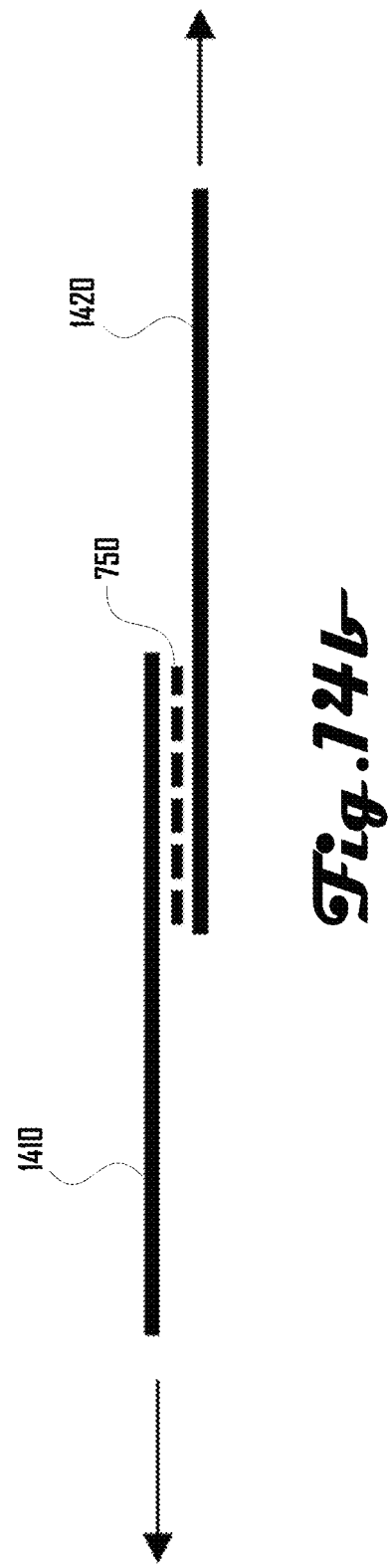

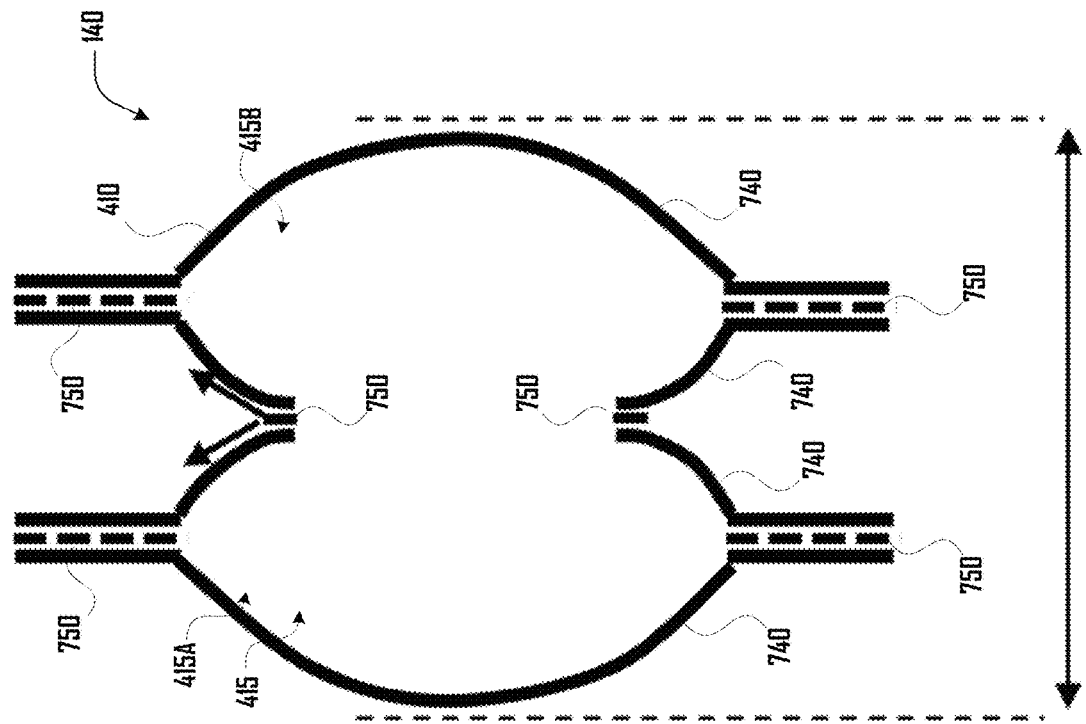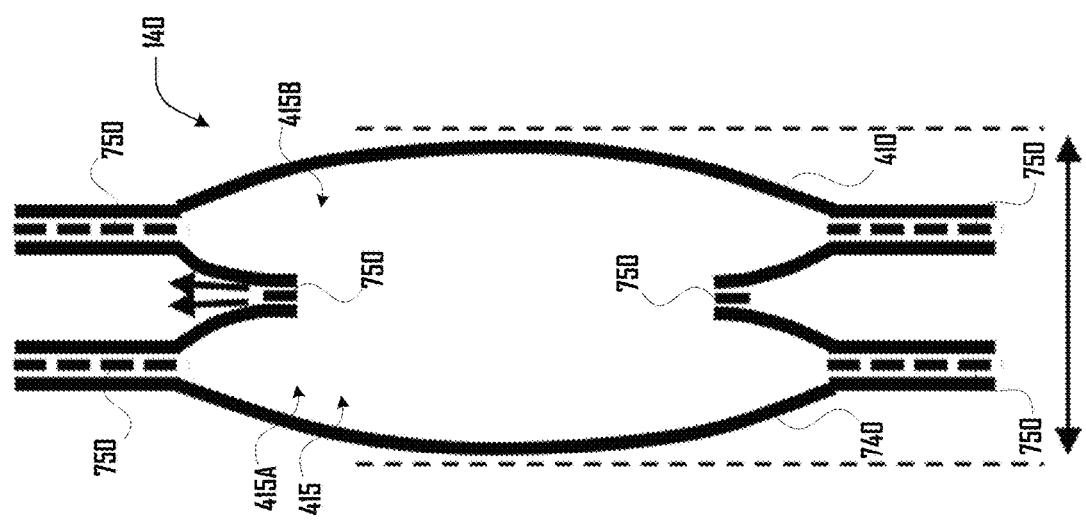

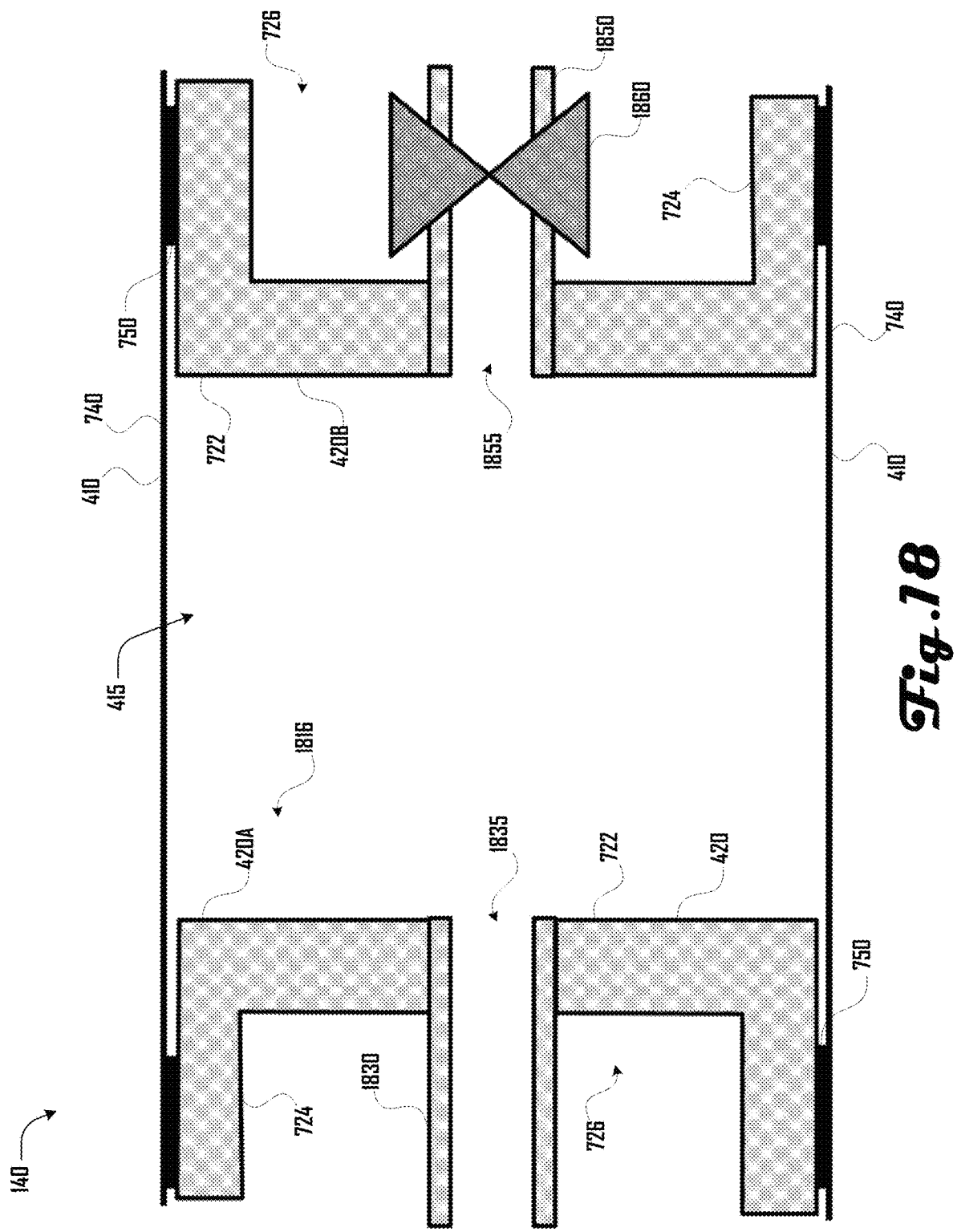

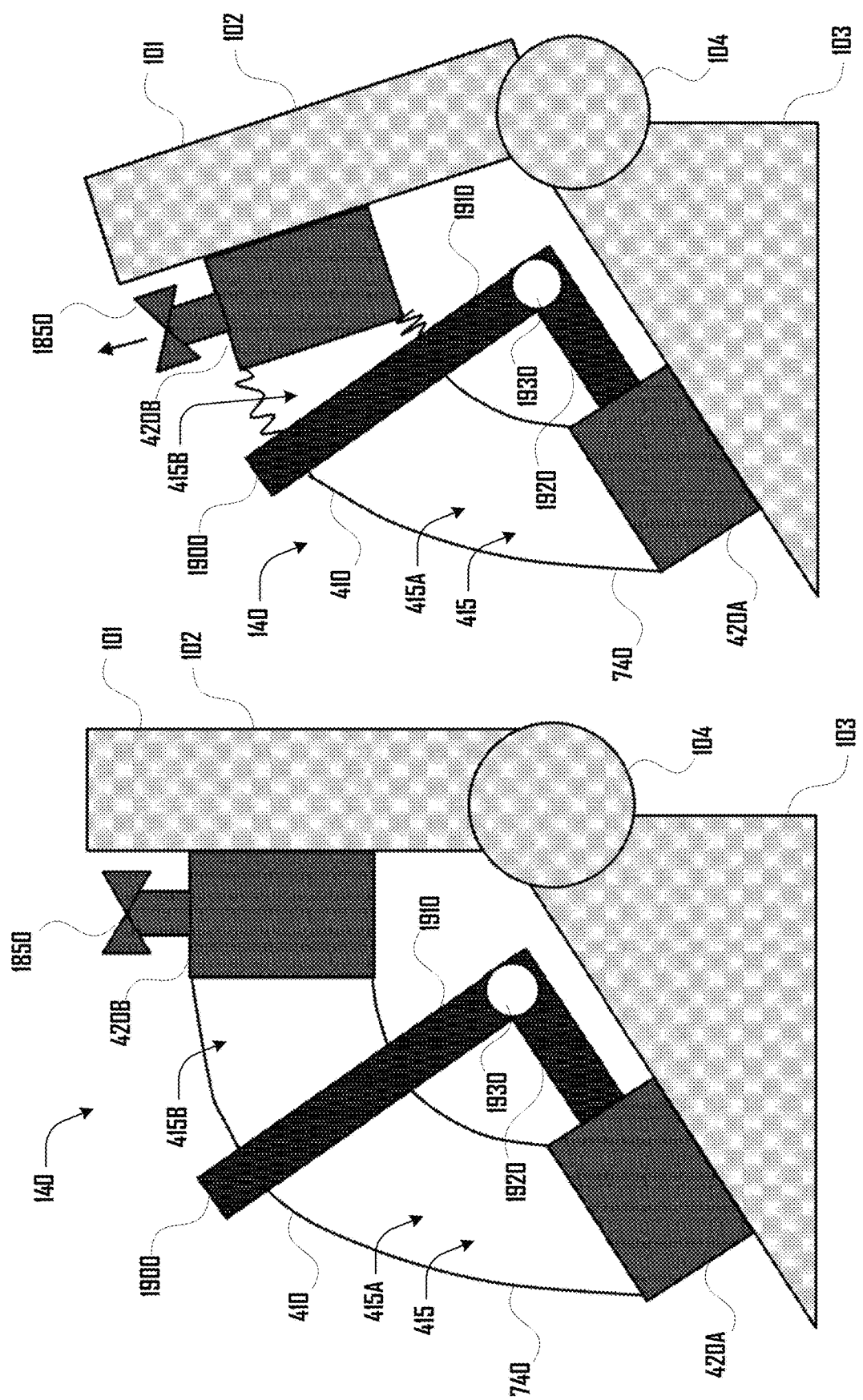

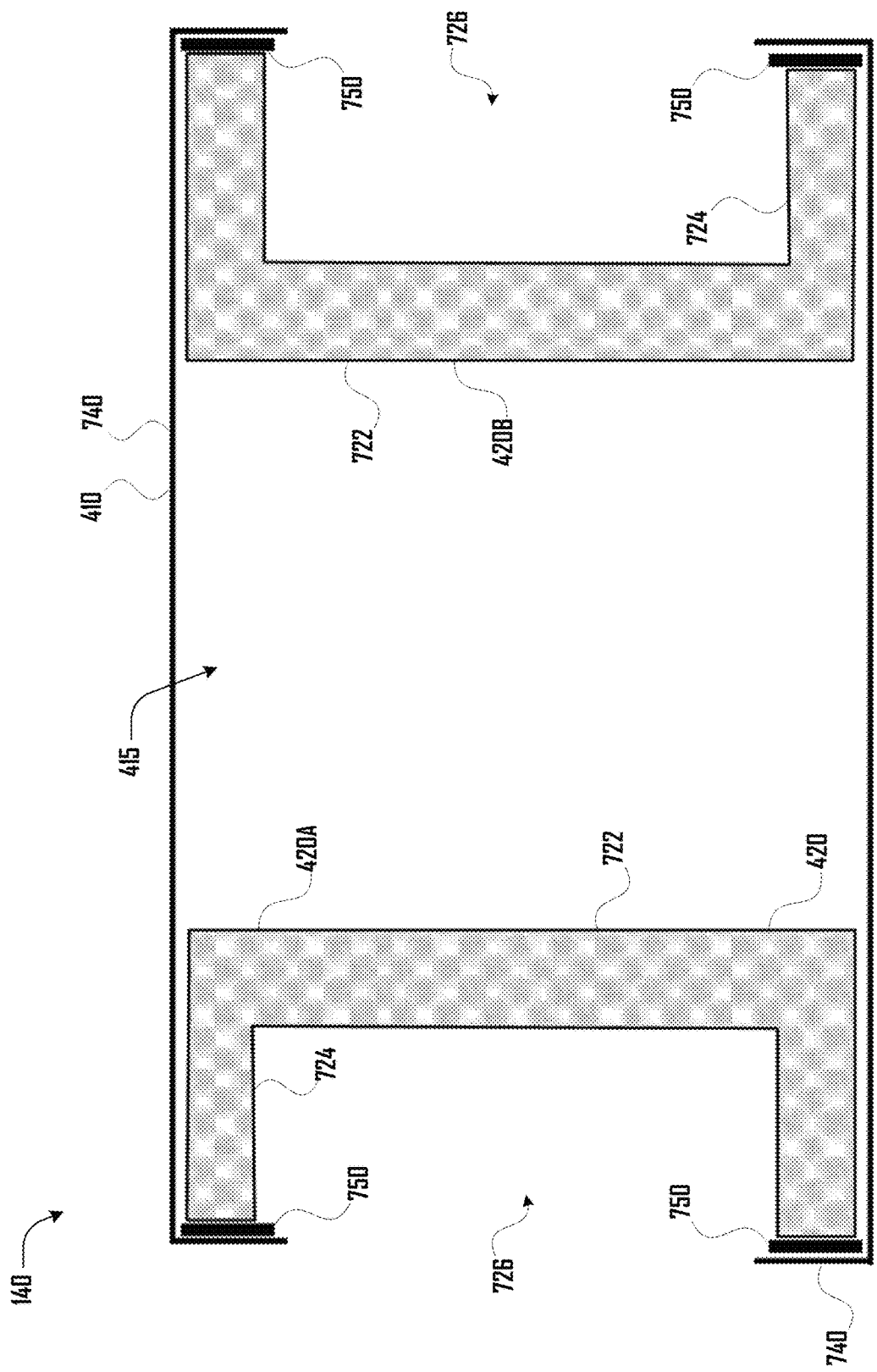

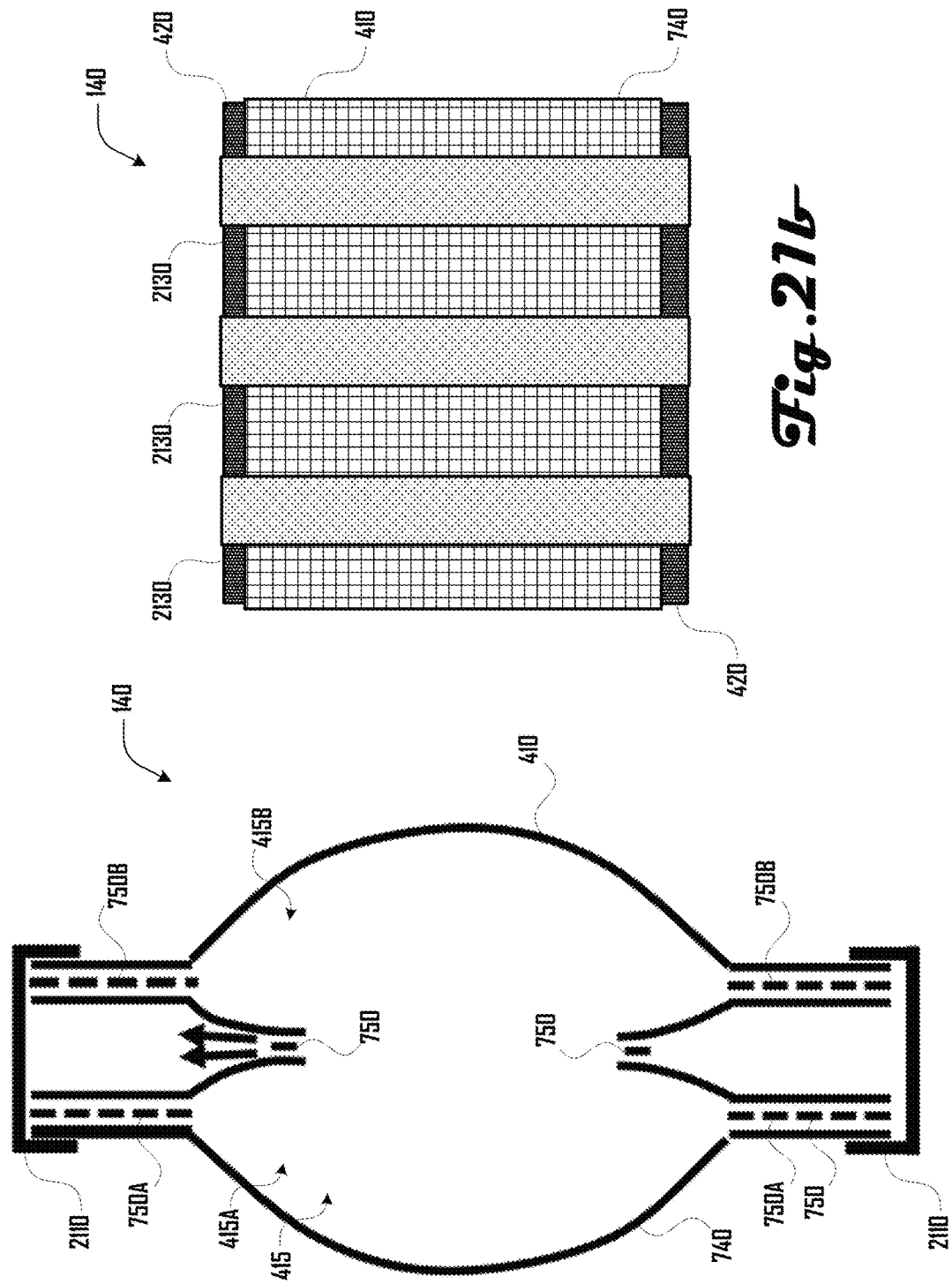

FLUIDIC ACTUATOR MANUFACTURING METHOD

CROSS-REFERENCE TO RELATED APPLICATIONS

This application is a non-provisional of and claims the benefit of U.S. Provisional Application 62/981,141 filed Feb. 25, 2020, and entitled "FLUIDIC ACTUATOR BLADDER GEOMETRY AND CONSTRUCTION METHOD". This application is hereby incorporated herein by reference in its entirety and for all purposes.

This application is also a non-provisional of and claims the benefit of U.S. Provisional Application 63/030,586, filed May 27, 2020, entitled "POWERED DEVICE FOR IMPROVED USER MOBILITY AND MEDICAL TREATMENT". This application is hereby incorporated herein by reference in its entirety and for all purposes.

This application is also a non-provisional of and claims the benefit of U.S. Provisional Application 63/058,825, filed Jul. 30, 2020, entitled "POWERED DEVICE TO BENEFIT A WEARER DURING TACTICAL APPLICATIONS". This application is hereby incorporated herein by reference in its entirety and for all purposes.

This application is also related to U.S. patent application Ser. No. 15/082,824, filed Mar. 28, 2016, entitled "LOWER-LEG EXOSKELETON SYSTEM AND METHOD". This application is hereby incorporated herein by reference in its entirety and for all purposes.

This application is also related to U.S. patent application Ser. No. 15/823,523, filed Nov. 27, 2017, entitled "PNEUMATIC EXOMUSCLE SYSTEM AND METHOD". This application is hereby incorporated herein by reference in its entirety and for all purposes.

This application is also related to U.S. patent application Ser. No. 15/953,296, filed Apr. 13, 2018, entitled "LEG EXOSKELETON SYSTEM AND METHOD". This application is hereby incorporated herein by reference in its entirety and for all purposes.

BRIEF DESCRIPTION OF THE DRAWINGS

FIG. 6b illustrates a cross-sectional view of the leg of a user and the fluidic actuator of FIG. 6a.

FIG. 7 illustrates a side cross sectional view of an example construction method of fluidic actuator where a welding tool generates a weld between a membrane material and two interfaces about an external edge of the interfaces.

FIGS. 10a and 10b illustrate an example of a support element that is configured to couple about and support welds between a membrane material and sidewalls of an interface.

FIG. 10c illustrates an example where a weld of an actuator has failed via a portion of membrane material decoupling from the interface.

FIG. 11b illustrates a fluidic actuator that can be generated by coupling the fluid-impermeable membrane material and a pair of interfaces of FIG. 11a.

FIG. 12a illustrates example of four pieces of material of two shapes that can be generated for constructing a fluid impermeable member of a fluidic actuator.

FIG. 12b illustrates a side view of a fluid impermeable member generated by the four pieces of material of FIG. 12a.

FIG. 12c illustrates a side cross-sectional view of a fluid impermeable member generated by the four pieces of material of FIG. 12a.

FIG. 13a illustrates a side cross-sectional view of a fluidic actuator having first and second opposing parallel interfaces with a membrane material coupled thereto having first and second sides with the first side being shorter than the second side.

FIG. 13b illustrates a configuration of the actuator of FIG. 13a where the interfaces are in a parallel configuration where the first side has reached a maximum length, whereas the second side has not reached a maximum length.

FIG. 13c illustrates a configuration of the actuator of FIGS. 13a and 13b where both the first and second sides have reached a maximum length such that the interfaces are disposed at an angle relative to each other.

FIG. 14a illustrates an example of a peel weld between a first and second element.

FIG. 14b illustrates a lap weld between a first and second element.

FIGS. 16a and 16b illustrate respective configurations of a fluid impermeable member defined by portions of a membrane material coupled together at a plurality of welds to define a fluid chamber having a first and second fluid chamber portion.

FIG. 18 illustrates an embodiment of a fluidic actuator having a first and second interface where the first interface comprises an inlet nozzle that defines an inlet channel and where the second interface comprises an outlet nozzle that defines an outlet channel.

FIGS. 19a and 19b illustrate two configurations of a multi-chamber fluidic actuator coupled to the leg and foot of a user configured to cause rotation about the ankle of the user.

FIG. 20 illustrates an example embodiment of a fluidic actuator comprising a first and second interface, where a membrane material extends between the interfaces and is coupled to an external face of the interfaces via a weld.

FIG. 21a illustrates a side cross-sectional view of an example embodiment of an actuator comprising a fluid chamber having a first and second sub-chamber defined by first and second welds with one or more straps can be coupled to portions of membrane material about the first and second welds that can constrain expansion of the fluid chamber.

FIG. 21b illustrates a side view of an example embodiment of an actuator comprising straps coupled to and extending between a pair of opposing interfaces, which can constrain expansion of a fluid impermeable member between the interfaces.

Figure 1:
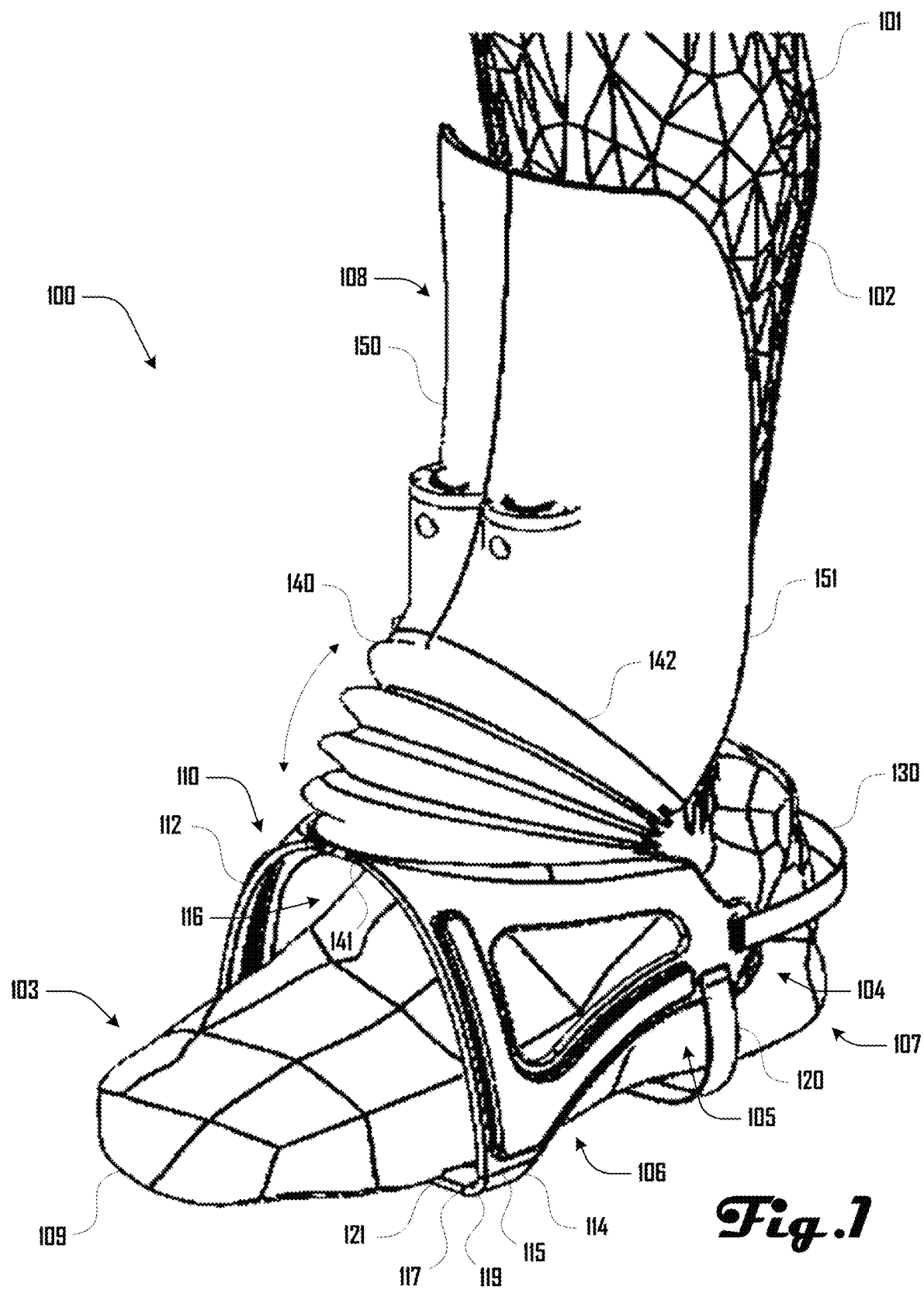
FIG. 1 illustrates an example of an exoskeleton comprising a fluidic actuator coupled about the ankle of a user.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

This application discloses examples of fluidic actuators that can be used in mobile robots such as exoskeletons worn by human users. Methods of making and designing such fluidic actuators are disclosed herein as well along with methods of using such actuators. In some embodiments, fluidic actuators can be small relative to the human body and can be able to reach high pressures (e.g., from 5 psig to 100 psig or more).

Turning to FIG. 1, an example lower-leg exoskeleton 100 is shown coupled to a user 101 about the leg 102, including the foot 103 and ankle 104. In this example, the lower-leg exoskeleton 100 is shown coupled about the tarsals 105, metatarsals 106, heel 107 and shin 108.

The lower-leg exoskeleton 100 is shown comprising a foot structure 110 that is coupled to an actuator 140 at a first actuator end 141, and further comprising a shin structure 150 coupled at a second actuator end 142. The foot structure 110 is shown including sidewalls 112 and a base 114, which define a slot 116 in which the foot 103 of the user 101 can be disposed. A base strap 120 is illustrated being coupled to the foot structure 110 and encircling a portion of the foot 103. A heel strap 130 is illustrated being coupled to the foot structure 110 and encircling a portion of the heel 107.

In this example, the sidewalls 112 define a generally C-shaped portion of the foot structure 110 with the base 114 being substantially planar and engaging a bottom portion of the foot 103. The foot structure 110 can be rigid and comprise materials such as plastic, metal or the like. In various embodiments, the base 114 can provide a load-path contact point forward of the heel 107 of a user, such as at or forward of the tarsals 105 or metatarsals 106.

In further embodiments, the foot structure 110 can comprise and/or be defined by inflatable structures that surround portions of the foot 103, including the tarsals 105 and/or metatarsals 106. In other words, structures such as the sidewalls 112, base 114, base strap 120, heel strap 130, or the like, can comprise an inflatable structure. In one example, inflatable structures can be positioned on the sole of the foot 103, which can be configured to spread a load generated while walking evenly across the ground or other surface being walked on.

Although the foot structure 110 is shown in one example configuration in FIG. 1, it should be clear that various other suitable configurations of a foot structure 110 are within the scope and spirit of the present disclosure. For example, a rigid superstructure can attach beneath the sole of the foot 103 and can skirt around the foot 103 to provide a force transmission platform above the foot 103.

In further embodiments, the lower-leg exoskeleton 100 can be configured to be worn over clothing and/or footwear such as a conventional boot, shoe, or the like. However, in some embodiments, a portion of the lower-leg exoskeleton 100 can be disposed in, comprise, or be integrally coupled with a boot, shoe, or the like. In other words, some examples provide specialized footwear for use with the lower-leg exoskeleton 100, which can incorporate portions of the lower-leg exoskeleton 100 or otherwise be specifically configured to be used with or coupled with the lower-leg exoskeleton 100. For example, structures such as the sidewalls 112, base 114, base strap 120, heel strap 130, or the like, can be disposed in or be defined by a portion of a shoe or boot.

In another embodiment, a boot or shoe can comprise a segmented structure that comprises a system of rigid panels connected by a flexible joint (e.g., an elastomer) that allows for in-plane rotation, (e.g., "in the plane" can include where the ankle rotates towards and away from the shin), and/or lateral motion. In a further embodiment, a structure in the heel of a shoe or boot can be configured to provide a load path for a reaction force that acts to lift the heel 107 of the user 101.

FIG. 1 illustrates an example composite structure that can act as an ankle actuation and passive support structure for a single-sided, single degree-of-freedom (DOF) ankle actuator. The example configuration shown in FIG. 1 comprises an inflatable actuator 140 coupled with rigid passive components (e.g., the foot structure 110 and the shin structure 150) to transfer torque generated by the actuator 140 to the user 101. Accordingly, in various embodiments, one or more rigid components associated with the sole of the foot 103 can be of sufficient strength to take the load of the actuator 140. In various embodiments as described in further detail herein, the inflatable actuator 140 can provide a moment about the ankle 104 of the user 101. For example, the foot structure 110 can be connected via a feature in the sole of a shoe that allows the user 101 to dorsiflex and/or plantar flex his or her foot 103.

Plantarflexion torque can be provided by inflating the actuator 140. In this example configuration, the actuator 140 may only connect to the footwear at a load transmission point, but this should not be construed to limit the many alternative embodiments of the design. Other versions of this system can be integrated in various suitable ways. For example, in some cases, the actuator 140 and footwear can encompass a single piece of hardware that is designed for a specific user (or for a specific size leg and foot), and thus can be smaller in some embodiments.

In some embodiments the rigid foot structure 110 comprises: a pair of sidewalls 112 configured to extend around the foot 103 of a user 101 and including first and second sidewall attachment points 115, respectively, on the sidewalls 112 for attachment with a removable base portion 117, and a removable flat base portion 117 configured to reside at the base of the foot of the user that includes first and second base attachment points 119 configured for removably coupling with the first and second sidewall attachment points, the removable flat base portion 117 integrally disposed within and extending through the sole of a footwear article 109 with the first and second base attachment points 119 disposed on respective external sides of the footwear article 109.

In some embodiments, the rigid foot structure 110 further comprises an inflatable structure 121. In some embodiments, an inflatable structure 121 is positioned at the sole of a foot of a user and configured to evenly spread a load on a surface generated while the user is walking on the surface. In some embodiments, the rigid shin structure further comprises an inflatable structure 151.

Accordingly, the inflatable actuator 140 can provide a moment about the ankle 104 of the user 101 due to the difference in expansion of the bladder segments 210 between the front and rear portions. For example, inflation of the actuator 140 can generate a moment that forces the shin structure 150 toward the shin 108 of the user, and a moment that generates plantar flexion of the foot 103. In other words, the shin structure 150 engaging the shin 108 opposes the actuator 140 such that a rotation generated by the actuator 140 during inflation results in rotation of the foot 103.

Although a generally C-shaped inflatable actuator 140 is illustrated in the example embodiment of FIG. 1, in further embodiments as discussed in detail herein, other suitable actuators and actuator configurations can be used. For example, in one embodiment, an actuator 140 can be powered in other suitable ways including via a motor, or the like. Additionally, in another example, an actuator can include elongated segments positioned along the length of the shin 108 at the front of the foot 103, which can be configured to expand and curl lengthwise to generate a moment that causes plantar flexion of the foot 103. In a further example, an actuator 140 can completely surround the foot 103. Accordingly, it should be clear that the example actuator 140 illustrated in this disclosure should not be construed to be limiting on the many alternative actuators that are within the scope and spirit of the present invention.

Figure 2:
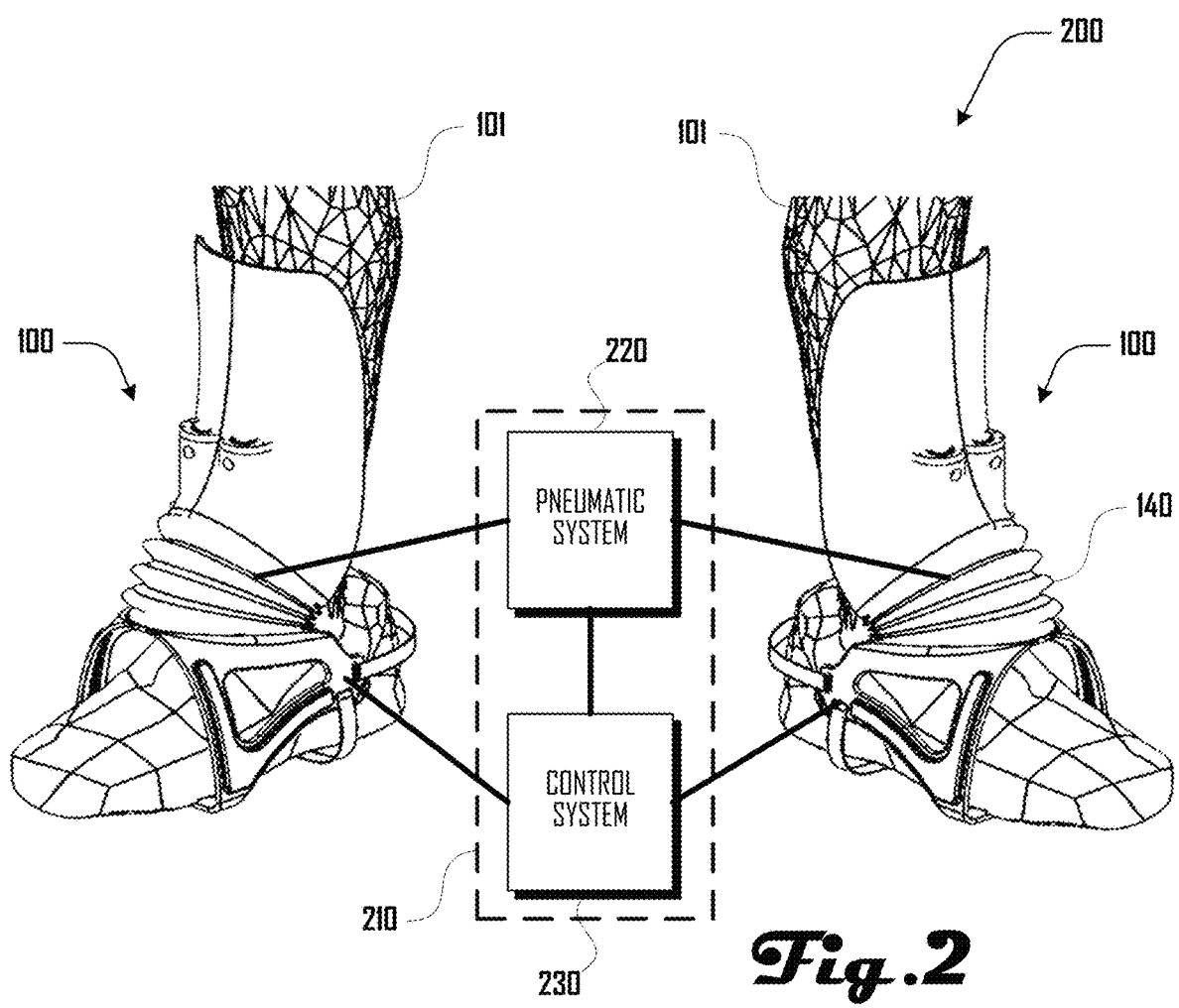
FIG. 2 is an example illustration of an embodiment of an exoskeleton system being worn on two legs of a user.

FIG. 2 illustrates an exoskeleton system 200 that comprises a first and second lower-leg exoskeleton 100 that are operably connected to an actuation system 210 that includes a pneumatic system 220 and a control system 230. The pneumatic system 220 is shown being operably connected to the actuators 140 and to the control system 230. The control system 230 is illustrated being operably connected to one or more portions of the lower-leg exoskeletons 100 and to the pneumatic system 220.

In various embodiments, the pneumatic system 220 can be configured to inflate and/or deflate the actuators 140 with a fluid. For example, in one embodiment, the pneumatic system 220 can only be configured to actively inflate the actuators 140 to cause expansion of the actuators 140 and plantar flexion, where deflation can be generated during contact with the ground during walking and where natural dorsiflexion occurs. In another embodiment, the pneumatic system 220 can be configured to actively inflate the actuators 140 to cause expansion of the actuators 140 and plantar flexion, and can actively generate dorsiflexion by actively evacuating fluid from the actuators 140 and/or by generating release of fluid from the actuators 140.

Alternatively, in some embodiments, the actuators can be configured oppositely. For example, inflation of the actuator 140 can cause dorsiflexion of the foot 103 and deflation can cause or be caused by plantar flexion of the foot 103. Additionally, although the example of a pneumatic system 220 is provided, which actuates the actuators 140 via a gas fluid (e.g., air), in further embodiments, the actuators 140 can operate via any suitable fluid, including water, oil, or the like.

In some embodiments, inflatable actuators can be positioned in other locations in addition to or alternatively to the inflatable actuator 140 illustrated in FIGS. 1 and 2. For example, one or more actuators can be positioned about the sole of the foot 103, at the heel 107, or the like. Such additional or alternative actuators can be configured to generate various types of movement of the foot 103, including inversion, eversion, plantar flexion, dorsiflexion, flexion of a toe, extension of a toe, and the like. Additionally, various suitable portions of a lower-leg exoskeleton 100 can comprise inflatable support structures as discussed herein.

The control system 230 can be associated with various suitable portions of the lower-leg exoskeleton 100 and can be associated with one or more suitable sensors. For example, sensors can determine a position, movement, rotation or orientation of the foot 103 and/or portion of the lower-leg exoskeleton 100. Additionally, and alternatively, such sensors can determine an inflation state of an actuator 140, a pressure associated with an actuator 140, or the like. Additionally, and alternatively, such sensors can measure body and/or environmental conditions such as temperature, moisture, salinity, blood pressure, oxygen saturation, muscle tension, and the like.

In various embodiments, the control system 230 can sense conditions associated with the lower-leg exoskeletons 100 and inflate and/or deflate the actuators 140 in response. In some embodiments, the control system 230 can generate a walking gait for a user 101 of the lower-leg exoskeletons 100 by selective inflation and/or deflation of the actuators 140. In other embodiments, the control system 230 can identify and support movements of a user 101 associated with the lower-leg exoskeletons 100. For example, the control system 230 can determine that a user 101 is lifting a heavy object and provide enhancing support to the user 101 in lifting the object by selective inflation and/or deflation of the actuators 140.

Accordingly, the present example embodiment shown in FIGS. 1 and 2 should not be construed to be limiting on the wide variety of alternative embodiments that are within the scope and spirit of the present invention. For example, in some embodiments, the control system 230 can comprise sensors such as ground reaction force sensors embedded in the sole of the shoe along with pressure and angle sensors to measure the effort of the actuation. Muscle activation sensors can also be integrated into footwear to allow for feedback control by the control system 230.

Figure 3:
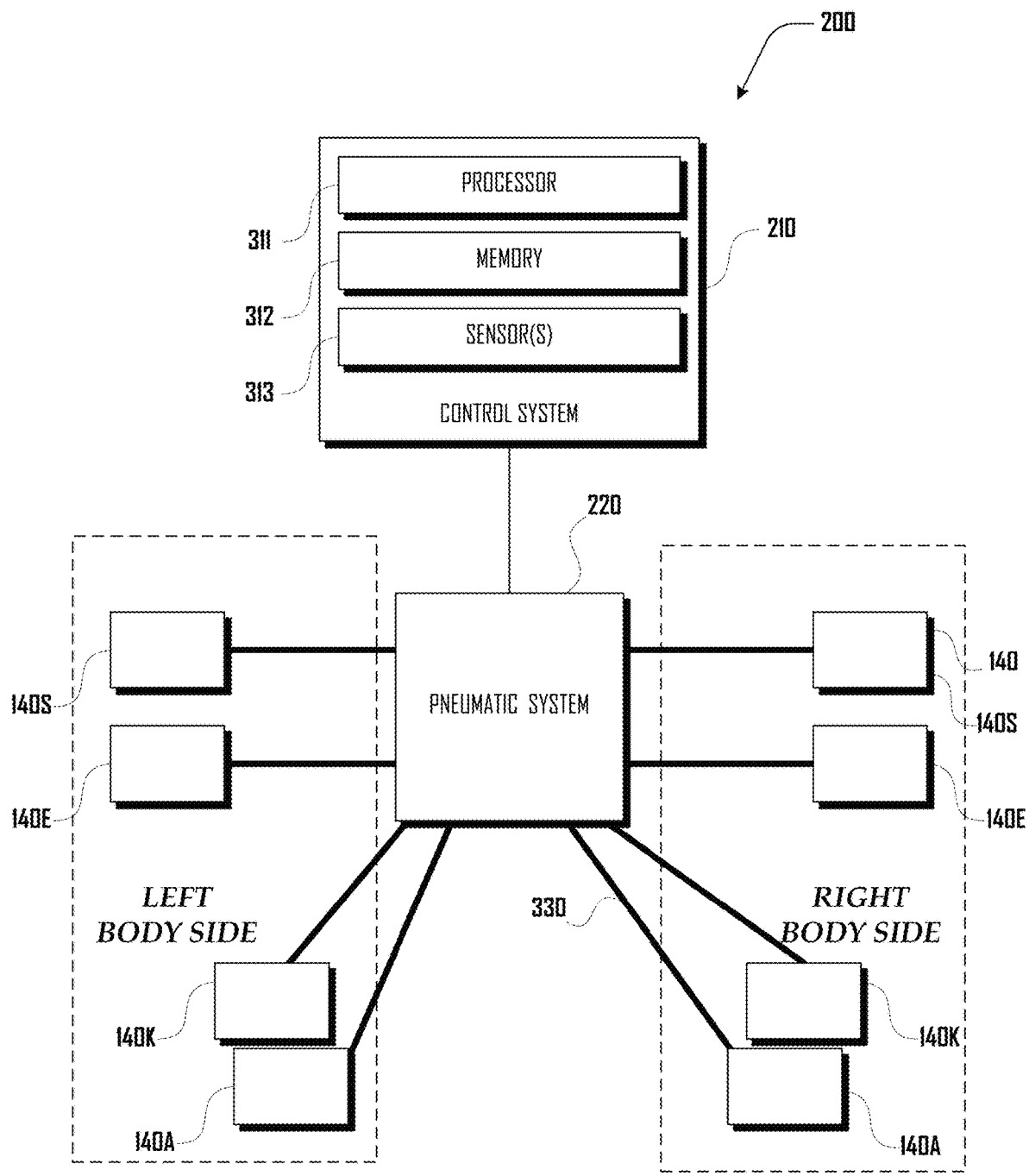
FIG. 3 is block diagram of an exoskeleton system.

FIG. 3 is a block diagram of an embodiment of an exoskeleton system 200 that includes a control system 210 that is operably connected to a pneumatic system 220. The control system 210 comprises a processor 311, a memory 312, and at least one sensor 313. A plurality of actuators 140 can be operably coupled to the pneumatic system 220 via respective pneumatic lines 330. The plurality of actuators 140 include pairs of shoulder-actuators 140S, elbow-actuators 140E, knee-actuators 140, and ankle-actuators 140A that are positioned on the right and left side of a body 101. For example, as discussed above, the example exomuscle system 100D shown in FIG. 3 can be part of top and/or bottom suits with the actuators 140 positioned on respective parts of the body 101 as discussed herein. For example, the shoulder-actuators 140S can be positioned on left and right shoulders; elbow-actuators 140E can be positioned on left and right elbows; knee-actuators 140K on our about the knee; and ankle actuators 140A can be positioned on or about the ankle 104.

In various embodiments, the example system of FIG. 3 can be configured to move and/or enhance movement of the user 101 wearing the exoskeleton system 200. For example, the control system 210 can provide instructions to the pneumatic system 220 that can selectively inflate and/or deflate the actuators 140. Such selective inflation and/or deflation of the actuators 140 can move the body to generate and/or augment body motions such as walking, running, jumping, climbing, lifting, throwing, squatting, or the like.

In some embodiments, such movements can be controlled and/or programmed by the user 101 that is wearing the exomuscle system 100D or by another person. Movements can be controlled in real-time by a controller, joystick or thought control. Additionally, various movements can be pre-preprogrammed and selectively triggered (e.g., walk forward, sit, crouch) instead of being completely controlled. In some embodiments, movements can be controlled by generalized instructions (e.g. walk from point A to point B, pick up box from shelf A and move to shelf B).

In further embodiments, the exomuscle system 100D can be controlled by movement of the user 101. For example, the control system 210 can sense that the user 101 is walking and carrying a load and can provide a powered assist to the user 101 via the actuators 140 to reduce the exertion associated with the load and walking. Accordingly, in various embodiments, the exomuscle system 100D can react automatically without direct user interaction.

Some example functions, configurations and uses are described and shown in U.S. Provisional Application 63/030,586, filed May 27, 2020, entitled "POWERED DEVICE FOR IMPROVED USER MOBILITY AND MEDICAL TREATMENT" and U.S. Provisional Application 63/058,825, filed Jul. 30, 2020, entitled "POWERED DEVICE TO BENEFIT A WEARER DURING TACTICAL APPLICATIONS". As discussed above, the present application claims priority to these provisional applications, and these provisional applications are incorporated herein by reference in their entirety and for all purposes.

In some embodiments, the sensors 313 can include any suitable type of sensor, and the sensors 313 can be located at a central location or can be distributed about the exomuscle system 200. For example, in some embodiments, the system 200 can comprise a plurality of accelerometers, force sensors, position sensors, and the like, at various suitable positions, including at the actuators 140 or any other body location. In some embodiments, the system 200 can include a global positioning system (GPS), camera, range sensing system, environmental sensors, or the like.

The pneumatic system 220 can comprise any suitable device or system that is operable to inflate and/or deflate the actuators 140. For example, in one embodiment, the pneumatic module can comprise a diaphragm compressor as disclosed in related patent application Ser. No. 14/577,817 filed Dec. 19, 2014.

Figure 4A:
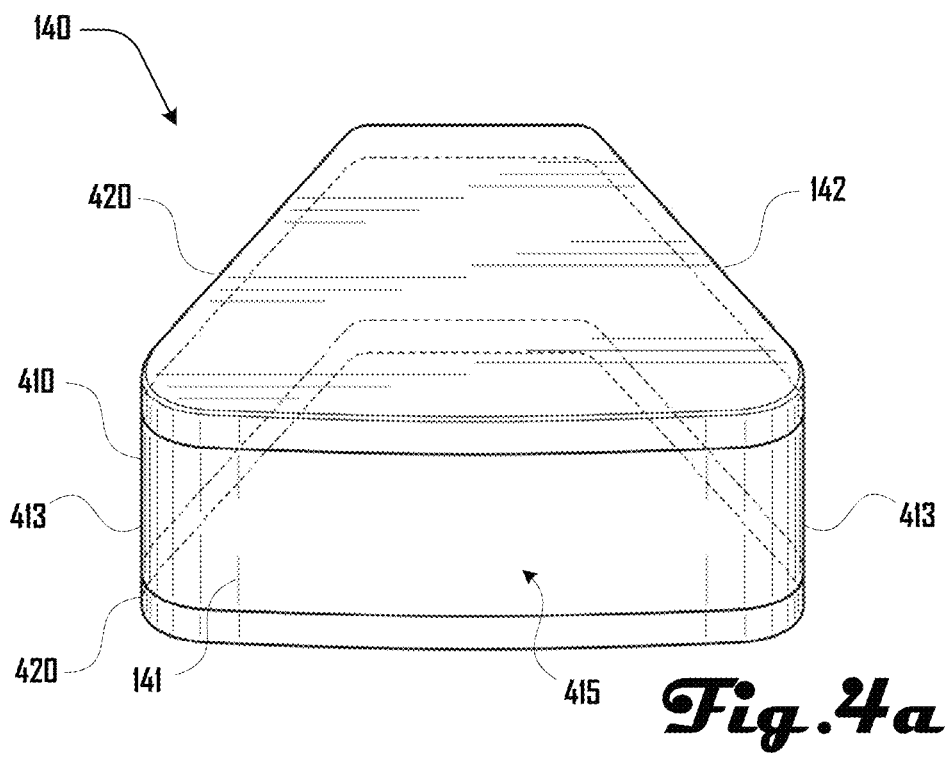
FIG. 4a illustrates a perspective view of an example embodiment of a fluidic actuator in a first configuration and comprising a first and second interface and a fluid impermeable member.
Figure 4B:
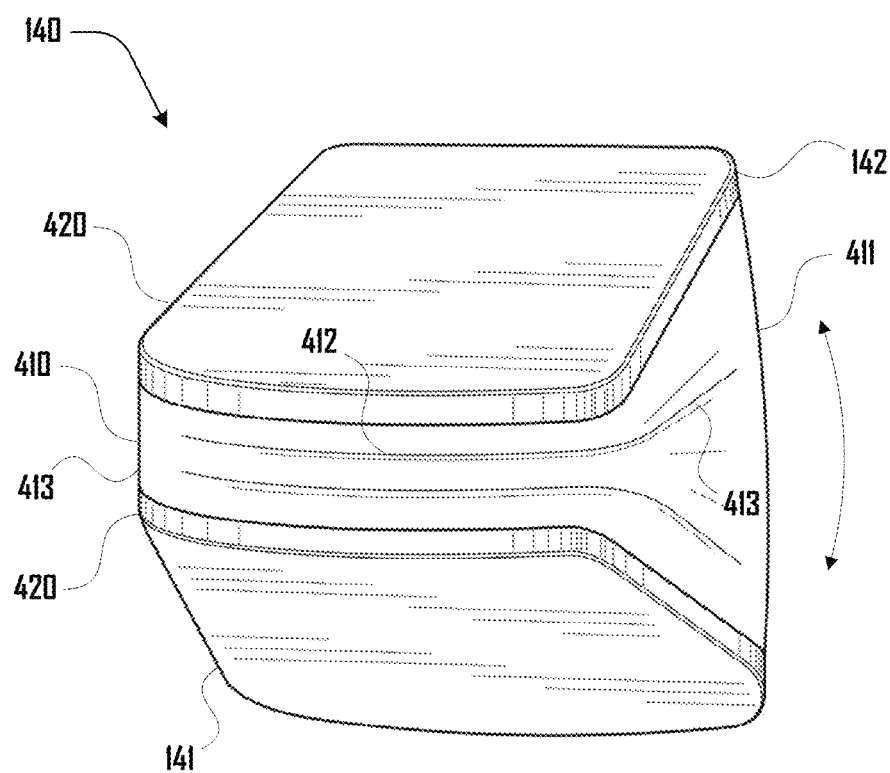
FIG. 4b illustrates a perspective view of the example embodiment of the fluidic actuator of FIG. 4a in a second inflated configuration.

Turning to FIGS. 4a and 4b, one example embodiment of an actuator 140 is illustrated that comprises a fluid-impermeable member 410 disposed between a pair of opposing interfaces 420 that define first and second ends 141, 142 of the actuator 140. The fluid-impermeable member 410 can define first and second opposing ends 411, 412 and opposing sidewalls 413. The fluid-impermeable member 410 can further define a fluid cavity 415, which can be configured to hold a fluid and be inflated and deflated via fluid being removed from and introduced to the cavity 415 as discussed herein. As shown in the example of FIGS. 4a and 4b, in some embodiments, the interfaces 420 can comprise planar plates, with the fluid-impermeable member 410 being configured to inflate via fluid in the fluid cavity 415, which can cause the first end 411 of the fluid-impermeable member 410 to expand and elongate more than the second end 412 of the fluid-impermeable member 410.

As discussed herein, interfaces 420 in some examples can be rigid, semi-rigid, flexible or some combination thereof. In some embodiments, the fluid-impermeable member 410 may comprise, consist essentially of or consist of inextensible or semi-extensible membrane materials with fluid-impermeable or near-impermeable qualities, such as coated fabrics or a urethane film supported by a fabric, or the like. As discussed in more detail herein, the fluid-impermeable member 410 can comprise a flexible, yet inextensible, sheet material such as a fabric.

Figure 5:
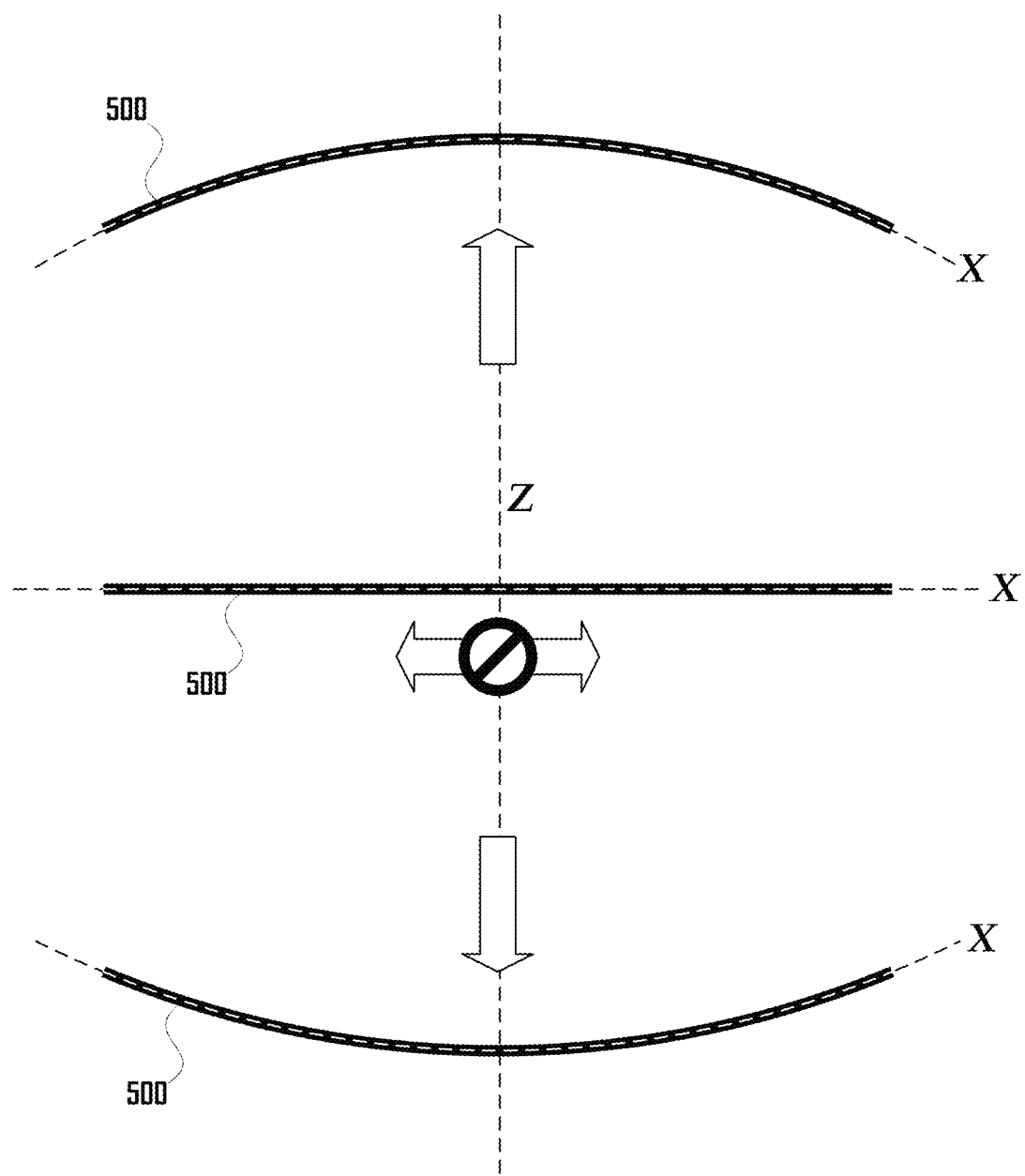
FIG. 5 illustrates an example planar material that is substantially inextensible along one or more plane axes of the planar material while being flexible in other directions.

For example, in some embodiments, the impermeable member 410 can comprise a flexible sheet material such as woven nylon, rubber, polychloroprene, a plastic, latex, a fabric, or the like. Accordingly, in some embodiments, the impermeable member 410 can be made of a planar material that is substantially inextensible along one or more plane axes of the planar material while being flexible in other directions. For example, FIG. 5 illustrates a side view of a planar material 500 (e.g., a fabric) that is substantially inextensible along axis X that is coincident with the plane of the material 500, yet flexible in other directions, including axis Z. In the example of FIG. 5, the material 500 is shown flexing upward and downward along axis Z while being inextensible along axis X. In various embodiments, the material 500 can also be inextensible along an axis Y (not shown) that is also coincident with the plane of the material 500 like axis X and perpendicular to axis X. FIGS. 13a, 13b and 13c also illustrates an example of an impermeable member 410 that can comprise an inextensible material and how such a material can affect the operation of a fluidic actuator 140.

In some embodiments, the impermeable member 410 can be made of a non-planar woven material that is inextensible along one or more axes of the material. For example, in one embodiment the impermeable member 410 can comprise a woven fabric tube or loop. Woven fabric material can provide inextensibility along the length of the impermeable member 410 and in the circumferential direction.

In various embodiments, the impermeable member 410 can develop its resulting force by using a constrained internal surface length and/or external surface length that are a constrained distance away from each other (e.g., due to an inextensible material as discussed above). In some examples, such a design can allow the actuator 140 to contract on the impermeable member 410, but when pressurized to a certain threshold, the impermeable member 410 can direct the forces axially by pressing on the interfaces 420 of the leg actuator unit 110 because there is no ability for the impermeable member 410 to expand further in volume otherwise due to being unable to extend its length past a maximum length defined by the body of the impermeable member 410.

For example, the impermeable member 410 can comprise a substantially inextensible textile envelope that defines a fluid cavity 415 that is made fluid-impermeable by a fluid-impermeable bladder contained in the substantially inextensible textile envelope and/or a fluid-impermeable structure incorporated into the substantially inextensible textile envelope. The substantially inextensible textile envelope can have a predetermined geometry and a non-linear equilibrium state at a displacement that provides a mechanical stop upon pressurization of the chamber to prevent excessive displacement of the substantially inextensible textile actuator.

In some embodiments, the impermeable member 410 can include an envelope that consists or consists essentially of inextensible textiles (e.g., inextensible knits, woven, non-woven, etc.) that can prescribe various suitable movements as discussed herein. Inextensible impermeable member 410 can be designed with specific equilibrium states (e.g., end states or shapes where they are stable despite increasing pressure), pressure/stiffness ratios, and motion paths. Inextensible textile impermeable member 410 in some examples can be configured accurately delivering high forces because inextensible materials can allow greater control over directionality of the forces.

Accordingly, some embodiments of inextensible textile impermeable member 410 can have a pre-determined geometry that produces displacement mostly via a change in the geometry between the uninflated shape and the pre-determined geometry of its equilibrium state (e.g., fully inflated shape) due to displacement of the textile envelope rather than via stretching of the textile envelope during a relative increase in pressure inside the chamber; in various embodiments, this can be achieved by using inextensible materials in the construction of the envelope of the impermeable member 410. As discussed herein, in some examples "inextensible" or "substantially inextensible" can be defined as expansion by no more than 10%, no more than 5%, or no more than 1% in one or more direction.

Returning to the example of FIG. 4, in some examples, the fluid cavity 415 can be defined exclusively by the fluid-impermeable member 410, or the fluid cavity 415 can be defined by a combination of the interface components 420 and fluid-impermeable member 410. Accordingly, in various embodiments, the interfaces 420 can comprise a material that is fluid-impermeable or near fluid-impermeable to store fluid within the fluid cavity 415. In various embodiments, the fluid-impermeable member 410 can comprise a bladder. The quality of impermeability of the fluid cavity 415 or materials that define the fluid cavity 415 can refer to the ability to contain a fluid in such a manner as to be able to produce a useful output, (e.g., as a force, position, or contained volume), which can be through the ability of the fluid-impermeable member 410 to contain the fluid at a desired pressure. When the fluid-impermeable member 410 is a closed volume, in various embodiments, there will be either no leakage or a very slow leakage of fluid.

Forces, moments and position changes can be produced by changing the pressure and volume of fluid disposed within the fluid cavity 415 of the fluidic actuator 140. The pressure of fluid within the fluid cavity 415 of fluidic actuator 140 can be negative, neutral or positive relative to the surrounding environment. The term "pressurized" can include any of these possible fluidic pressure states. In some embodiments, fluid introduced to and/or removed from the fluid cavity 415 can comprise gases such as air, liquid, liquefied gas, slurries, liquids containing solids, molten solids, or the like.

As discussed herein such fluidic actuators 140 can be used in a variety of applications, some of which may include but are not limited to controlling positioning between two or more bodies, producing force between two or more bodies, creating a moment about an axis or axes, or propelling a single body, where a body is generalized to any physical object/thing that may be composed of a flexible, semi-rigid, or rigid single body or multiple of such bodies interconnected. For example, elements of a robotic exoskeleton 200 can be coupled to the interfaces 420, and expansion of the fluid cavity 415 via fluid can apply force the interfaces 420. Such a force can move the body 101 of a user such as the joint of the ankle 104, as discussed herein.

The fluidic actuator may apply forces or moments with a specific or generalized direction or directions, whether through the interfaces 420 themselves, through interaction with the fluid-impermeable member 410 itself, or any combination therein. These force and positioning abilities can direct application for use in body-worn exoskeleton devices 200, such as those that can assist with flexion and/or extension at a human body joint, including the ankle, knee, elbow, hip, neck, and the like.

One or more interfaces 420 can provide various suitable functions or combinations of functions in some examples, including but not limited to acting as a connection point for the actuator 140 to another body; acting as a fluid manifold between the impermeable member 410 (e.g., a bladder) and another fluidic element such as a valve; acting as a manipulator of the impermeable member 410 to change the geometry of the impermeable member 410; and participating as an element through which the force of the impermeable member 410 can be applied or which can guide the application of that force (such as in direction or magnitude).

Some configurations of a fluidic actuator 140 have two interface components 420 as shown in the example of FIGS. 4a and 4b, but further examples can include any suitable plurality of interfaces 420, a single interface 420, or interfaces can be specifically absent from a fluidic actuator 140. Some configurations of an actuator can have interfaces 420 located at opposing ends 141, 142 of the fluidic actuator 140, but these interfaces 420 can be located anywhere on the fluidic actuator 140 in further examples, including but not limited to at the ends, sides, and circumferentially disposed on or about the actuator 140. An interface 420 can be made of a number of different or combination of suitable materials (e.g., polymer, metal, wood, or the like) and can have various suitable geometries. In some embodiments, an interface 420 can comprise a component that is an integral part of a fluidic actuator 140, but may also be shared and integral to other bodies in some examples, including but not limited to other fluidic actuators, structures, exoskeletons, and the like.

One or more interfaces 420 can take on any suitable geometry. In some embodiments, parameters that influence the geometry of an interface 420 can include but are not limited to structural properties of the interface 420 (e.g., strength, stiffness, weight and appearance); any internal or external geometries of the interface that may be required for the interface 420 to act as a fluid manifold; any constraints such that the interface 420 can interact with a human user 101 or other body; an anticipated amount of force applied by or to the interface 420 during operation; a desired direction or directions of force application by one or more interface 420; features that promote the positioning and/or connection of the actuator 140 to another body or bodies; features of the interface 420 that support the manufacturability of the impermeable member 410, and the like.

Figure 6B:
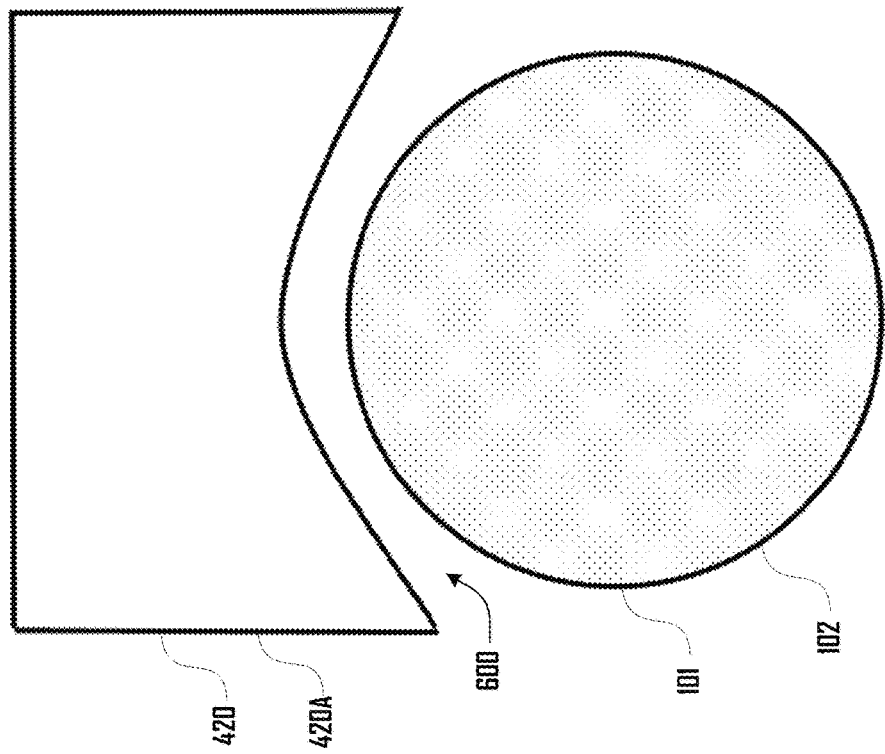
Figure 6A:
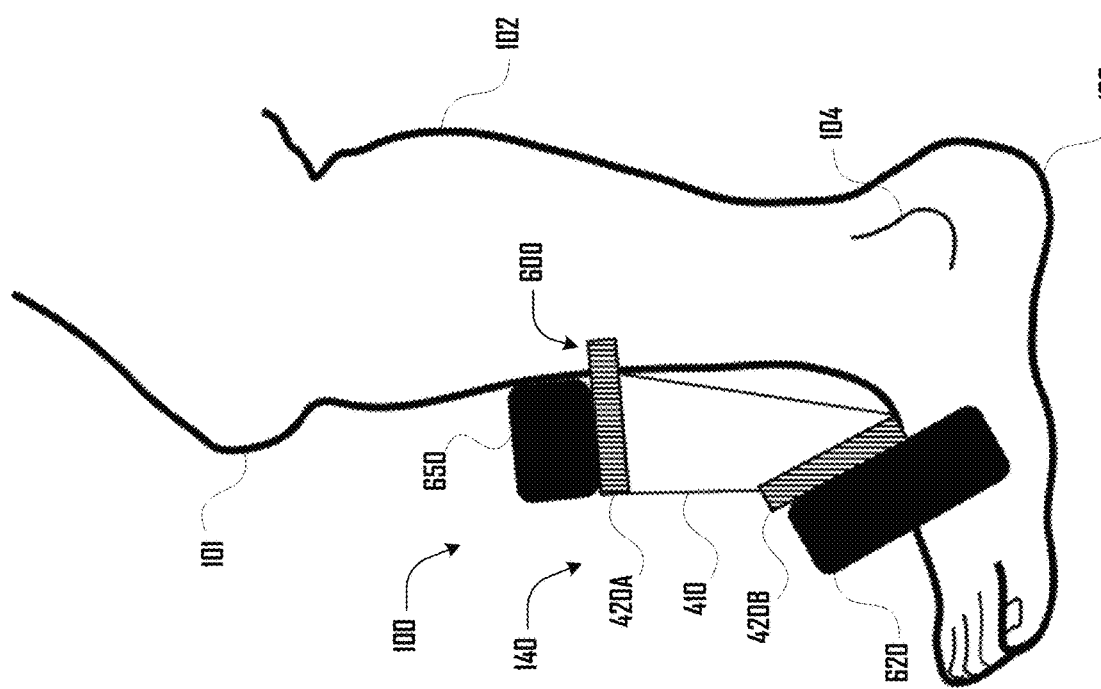
FIG. 6a illustrates a side view of an example fluidic actuator coupled about the ankle of a user.

In some embodiments, the geometry of one or more interfaces 420 can be configured to correspond to the shape of portions of the human body, which can be desirable to accommodate the application of forces and moments about various joints. For example, FIGS. 6a and 6b illustrate an example of an actuator 140 having first interface 420 with a curved cutout portion 600 defined by an edge of the interface 420A, which can be desirable to avoid undesirable physical interaction with the shin of the leg 102 of the user 101 when the actuator 140 acts as part of an exoskeleton 100 that sits between the foot 103 and lower leg 102, as shown in the example of FIGS. 6a and 6b. Specifically, as shown in FIG. 6b, the curved cutout portion 600 of the interface 420A can comprise a concave rounded profile that corresponds to the generally rounded portions of the leg 102 of the user 101, where the interface 420A can engage. For the purpose of clarity, the cross-sectional perspective of FIG. 6b illustrates the interface 420A spaced apart from the leg 102 of the user 101, but it should be clear that the interface 420A can engage the leg 102 of the user 101.

In further embodiments, one or more interfaces 420 of an actuator 140 can be configured to correspond with the shape of various suitable portions of the body of a user 101. For example, FIG. 6a illustrate an example of an actuator 140 coupled about the ankle 140 of a user 101 with a first and second interface 420A, 420B respectively engaging the foot 103 and lower portion of the leg 102 and respectively coupled to a foot portion 620 and lower leg portion 650 of an exoskeleton 100. In various embodiments, the second interface 420B can be shaped to correspond to the top of the foot 103 where the interface 420B is engaging. In further embodiments, one or more interfaces 420 can be configured to correspond to the shape of toe(s), foot, lower leg, upper leg, torso, finger(s), wrist, forearm, upper arm, shoulder, neck, head, and the like.

The shape and size of one or more interfaces 420 can also be designed to provide a specific desired application force based on the fluidic pressure and contact surface area between the interface 420 and another element. The geometry of an interface 420 can also include features to promote the longevity of a fluidic actuator 140, which may include but are not limited to features that reduce failures within or of the impermeable member 410 (e.g., a bladder), interface, a bladder-to-interface connection, or the like. Some example embodiments of these interface features can include chamfers, fillets, rounded edges, and the elimination of any sharp corners, edges, burrs, or abrupt transitions in the interface geometry at portions the impermeable member 410 contacts one or more interface 420 and/or is connected to the one or more interface 420, which may reduce failure of the impermeable member 410 during pressurization due to puncture or tearing of the material of the impermeable member 410. Other example embodiments can include the addition of ribs, combinations of different strength and stiff materials, and other features that may be configured to reduce the likelihood of an interface 420 cracking or breaking when force is applied to the interface 420, whether from the fluidic actuator 140 itself, such as during pressurization, or when force is applied to another external body.

Various embodiments can be configured for manufacturing. For example, FIG. 7 illustrates an example actuator 140 having a first and second interface 420 in accordance with one embodiment 720 that comprise an interface plate 722 with a lip 724 extending around the perimeter of the interface plate 722 that defines an interface cavity 726. Such a configuration of the interfaces 420 can allow for welding of a fluid-impermeable membrane material 740 to external sidewalls of the interface 720 as shown in the example of FIG. 7 to generate the fluid-impermeable member 410 of the actuator 140. Such a configuration of an interface 420 having a lip 724 and interface cavity can be considered to be a planar interface 420 in various embodiments.

For example, FIG. 7 illustrates an actuator 140 having three welds 750 that couple the fluid-impermeable membrane material 740 to external sidewalls of the interface 720 to generate the fluid-impermeable member 410 and fluid cavity 415 defined by the interfaces 420 and membrane material 740. FIG. 7 further illustrates a fourth weld being generated at a weld location 730 via a welding tool 710 having a first portion 712 configured to be disposed within the interface cavity 726. A second portion 714 of the welding tool 710 is shown disposed facing an external face of the membrane material 740 with a portion of the lip 724 of the interface 720 and portion of the membrane material 740 between the first and second portions 712, 714 of the welding tool 710 that defines the weld location 730. Energy 735 an can be applied by the welding tool 710 at the weld location 730, which can generate a weld 750 that couples the fluid-impermeable membrane material 740 to lip 722 of the interface 720. Various suitable types of welding can be used, including ultrasonic welding, inductive welding, and the like.

Figure 17A:
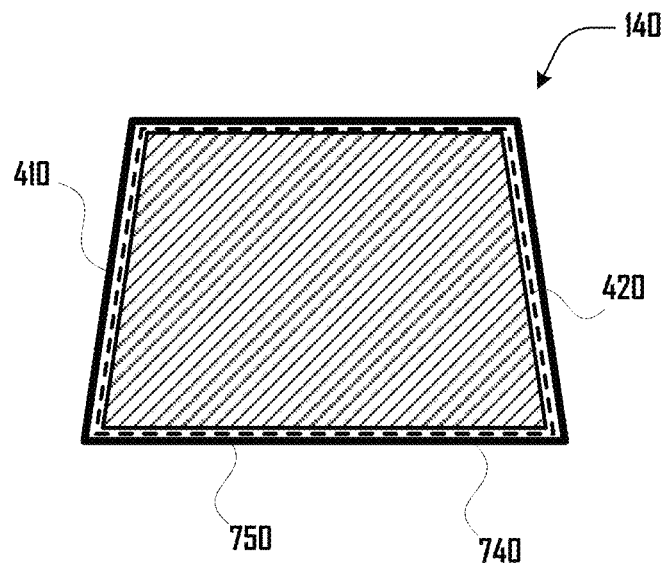
FIG. 17a illustrates top view of a fluidic actuator having a trapezoidal interface with a membrane material coupled about an edge of the interface via a weld.
Figure 17B:
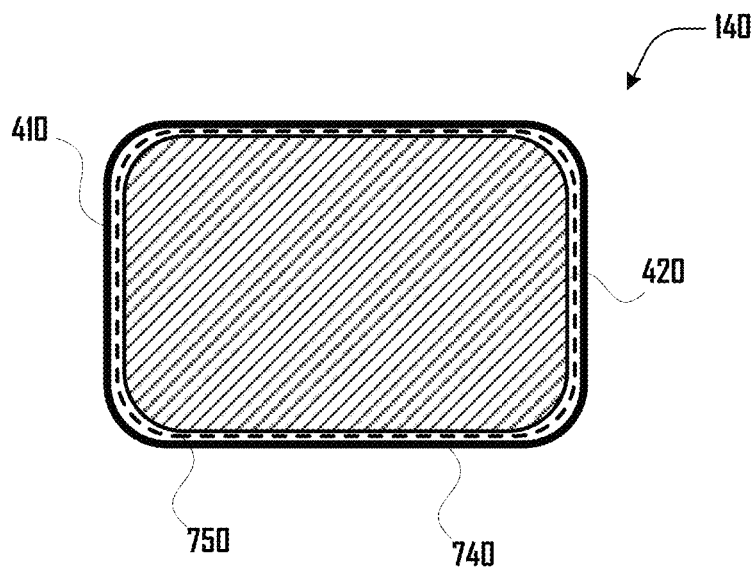
FIG. 17b illustrates top view of a fluidic actuator having a rectangular interface with a membrane material coupled about an edge of the interface via a weld.

One example of such an embodiment can comprise interface plates 722 with an extended lip 724 around the perimeter of the plates 722 which allows for the ability to use the welding machine 710 to weld a membrane material 740 circumferentially around the interface 720 (see e.g., example of FIGS. 17a and 17b). Such a manufacturing technique can allow in some examples for a fluidic actuator 140 to be made at a mass manufacturable scale, where the fluidic actuator 140 comprises two opposing interfaces 420 surrounded by a fluid-impermeable membrane 740 to generate a fluid-impermeable member 410 and fluid cavity 415 of the actuator 140.

Another embodiment of geometry of an interface 420 that can provide for mass-manufacturing can include the use of features integrated into the interface 420 that mate with features in a membrane material 740, which can increase ease of locating the membrane material 740 relative to the interface 420 and/or of holding the membrane material 740 in place, which can facilitate welding of the membrane material 740 to one or more interface 420. One example of such mating features is screws that are over-molded into an injection molded plastic interface 420 that can match locating holes in a fluid-impermeable coated fabric that acts as the membrane material 740. Another embodiment of an interface 420 can include interface geometry that allows for membrane material 740 to pass through the interface 420, which can be used to divide the fluid-impermissible member 410 (e.g., a bladder) into different useful volumes, which can generate a fluid-impermissible member 410 having a plurality of fluid cavities 415.

An interface 420 can be made of various suitable types of materials including but not limited to metals like aluminum and steels, plastics like polycarbonate, engineered polyurethane and injection molded thermoplastic polyurethanes (TPU), composites like carbon fiber, rubbers, woods, and other materials as well as any combination thereof that may be rigid, semi-rigid or flexible. Some examples of combinations of materials include but are not limited to materials joined by mechanical and chemical bonds, such as a plastic over-molded with a rubber, metal glued to plastic with an adhesive, or metal fixed to a carbon fiber plate with screws. Material selection can be dictated in some embodiments by the amount of force application expected during use or manufacturing, as well as other requirements such as stiffness/flexibility, weight, ease of manufacturability, cost, accessibility, time to acquire, biocompatibility, durability, ability to undergo decontamination, or ability to bond with the fluidic actuator directly. These different combinations of materials can be used in some examples to create variable stiffnesses, strengths, frictions, colors, etc., throughout the interface 420, which in turn may have benefits including the ability to change the interface geometry when the fluidic actuator 140 is pressurized or where a pre-determined failure of a weaker material within the interface 420 could be utilized as a safety measure against over-pressurization.

Additionally, in various examples, one or more interfaces 420 can also be used as a manifold to allow for the control of fluidic flow into and out of the fluid cavity 415 of an actuator 140 such that the fluid cavity 415 of the fluid-impermissible member 410 can be pressurized and depressurized. Embodiments can include but are not limited to one or more fixed open pathways through the interface 420 such as an inlet and outlet nozzle or through-hole with a face seal, valves integrated into the plate itself, as well as other integrations of fluidic components or pathways. Such fluidic pathways within a manifold may be created in various suitable ways including via additive manufacturing/3D printing or material machining methods which in some examples may require more than one body joined and sealed together to create one or more fluidic pathways. Some example embodiments of valves that can be incorporated into the interface 420 or manifold of an interface 420 can include check valves, one-way valves, poppet valves, proportional valves, etc., which may be self-regulating and/or externally controlled through manual, mechanical, electromechanical or other suitable methods. Other fluidic components that can be incorporated into an interface 420 in accordance with further embodiments can include silencers and/or diffusers which may assist with noise reduction and fluidic fittings (e.g., push-to-connect fittings) that allow for external connections.

For example, FIG. 18 illustrates an embodiment of a fluidic actuator 140 having a first and second interface 420A, 420B, where the first interface 420A comprises an inlet nozzle 1830 that defines an inlet channel 1835 and where the second interface comprises an outlet nozzle 1850 that defines and outlet channel 1855. The outlet nozzle 1850 can comprise an outlet valve 1860. In various embodiments, the inlet and outlet nozzles 1830, 1850 can be configured to introduce and remove fluid from the fluid chamber 415, which can cause the actuator 140 to expand and contract as discussed herein. For example, the inlet nozzle 1830 can be coupled to a pneumatic system 220 via one or more pneumatic lines 330 (see, e.g., FIGS. 2 and 3), which can be configured to introduce fluid into the fluid chamber 415 of the actuator 140 via the inlet nozzle 1830.

Fluid within the fluid chamber 415 of the actuator 140 can be removed or allowed to escape via the outlet nozzle 1850. For example, in some embodiments, the outlet valve 1860 can be opened (e.g., via a control system 210 and/or pneumatic system 220) which can allow fluid within the fluid chamber 415 of the actuator 140 to leave the fluid chamber 415. In some embodiments, fluid leaving the fluid chamber 415 via the outlet nozzle can be vented to the external environment or can be vented to a storage location, to another pneumatic actuator 140, to a pneumatic system 220, one or more pneumatic lines 330 or the like.

As shown in the example of FIG. 18, the inlet and outlet nozzles 1830, 1850 can extend from the interfaces 420A, 420B toward opposing sides of the actuator 140 or external faces of the respective interfaces 420. In some embodiments, the inlet and outlet nozzles 1830, 1850 can be an integral part of the interfaces 420 such as being manufactured as part of the interfaces via additive manufacturing, injection molding, milling, or the like. Additionally, while the example of FIG. 18 illustrates the inlet and outlet nozzles 1830, 1850 respectively being part of the first and second interfaces 420A, 420B, in some embodiments, one interface 420 can comprise both the inlet and outlet nozzles 1830, 1850 with another interface being without the inlet or outlet nozzles 1830, 1850. In further embodiments, an actuator can have only a single nozzle, which provides for fluid both leaving and being introduced to the fluid chamber 415.

One embodiment of a manifold of an interface 420 can include an interface 420 that allows membrane material 740 (e.g., portion of a bladder) to travel or sit through the interface 420, where a manifold of the interface 420 is configured for pinching off some or all of the membrane material 740, forming separate fluid cavities 415 within a fluid-impermeable member 410 where flow is either completely or partially interrupted between the separate fluid cavities 415. In various embodiments a manifold of an interface 420 can generate one or more fluid cavities 415 within a fluid-impermeable member 410 (e.g., within a bladder). Such pinching off of the fluid-impermeable member 410 can be created in various suitable ways including mechanical, electromechanical, pneumatic, hydraulic, magnetic, or the like. One example embodiment can include an interface 420 incorporating two mechanical jaws operated by a solenoid, where activating the solenoid closes the jaws onto a bladder, thus creating separate fluid chambers 415 in the bladder. If the jaws shut completely across the membrane of the bladder, then flow can be completely interrupted between the newly formed fluid chambers 415. If such fluid chambers 415 are not shut completely or are shut completely but in such a way that the fluid chambers 415 are not fully separate, then flow of fluid between the chambers 415 can be more restricted than previously between the newly formed chambers 415. In some examples, this can allow for the dynamic or static creation of chambers 415 with different pressurizations, where one chamber 415 can be held at a constant volume and/or pressure while another is actively being pressurized and changing volume. Various examples can generate chambers 415 that are pressurizing and changing volume at different rates, and various examples can generate chambers 415 that are both statically holding a constant volume and/or pressure.

FIGS. 19a and 19b illustrate two configurations of a fluidic actuator 140 coupled to the leg 102 and foot 103 of a user 101 configured to cause rotation about the ankle of 104 of the user 101. As shown in the example of FIGS. 19a and 19b the actuator 140 can comprise a fluid impermeable member 410 defined at least in part by a membrane material 740. The fluid impermeable member 410 can define a fluid chamber 415 that can be configured to be separated into a first and second sub-chamber 415A, 415B via a pinching system 1900 that comprises a pinching mechanism 1910 rotatably coupled to a bar 1920 via a hinge 1930. The pinching mechanism 1910 can be configured to pinch a central portion of the fluid impermeable member 410 to partially or completely separate the fluid chamber 415 into the first and second sub-chambers 415A, 415B. As discussed herein, such a pinching system 1910 can comprise various suitable structures such as a pair of jaws, pair of bars, a pinching aperture, or the like.

FIG. 19a illustrates a first configuration where the first and second sub-chambers 415A, 415B are pressurized and FIG. 19b illustrates a second configuration where the first sub-chamber 415A remains pressurized while the second sub-chamber 415B is depressurized or at least pressurized less than the first sub-chamber 415A. For example, an outlet valve 1860 of the second interface 420B can open to allow fluid in the second sub-chamber 415B to be vented from the second sub-chamber 415B while the first sub-chamber 415A can remain fully or partially pressurized via complete or partial 1910 pinching between the first and second sub-chambers 415A, 415B. As shown in FIG. 19*a* pressurization of both the first and second sub-chambers 415A, 415B can generate an angle between the leg 102 and foot 103 of the user 101 to be larger than an angle between the leg 102 and foot 103 of the user 101 when the second sub-chamber 415B is fully or partially depressurized as shown in FIG. 19*b*.

Having multiple chambers 415 can be useful in some embodiments when considering the stroke of a fluidic actuator 140 and the usage of the pressurized fluid within one or more of the chambers 415 to create that stroke. One example embodiment can include a fluidic actuator 140 with an interface 240 across a mid-plane of the actuator 140 that can pinch off a bladder of the actuator completely to generate two or more chambers 415. Then, a manifold interface to one of the chambers 415 can allow for the pressure and/or volume to change in that chamber 415, while the other chamber 415 is held constant in volume. Instead of having to empty and refill the entire bladder to achieve a desired range of motion (which can be a subset of the entire range of motion of the actuator 410), only the smaller chamber can be emptied and refilled with pressurized fluid in some examples.

One or more interfaces 420, in some embodiments, can be used to provide accessibility and the ability for sensing of the state of the fluid-impermissible member 410 (e.g., a bladder), the state of pressurized fluid within one or more fluid chamber 415 and/or the state of the interface 420 itself including but not limited to fluidic pressure, volumetric flow rate of fluid into and out of the fluid-impermissible member 410, temperature and/or volume of fluid, mechanical strain of the fluid-impermissible member 410, total volume of the fluid-impermissible member 410, force applied by the fluid-impermissible member 410 and/or interface 420 to another body, mechanical strain on the interface 420, vibration of the fluid-impermissible member 410 and/or interface 420, and various other characteristics.

Various suitable sensors can be used to sense these characteristics including but not limited to pressure sensors, force gauges, strain gauges, temperature sensors, accelerometers, flowmeters and other suitable devices. In some embodiments, sensors can be integrated into flow path through the interface 420 (e.g., temperature sensor to measure flow temperature or anemometer to measure flow velocity), adjacent to the flow path, sometimes with an additional dead volume (e.g., for pressure measurements), on the surface of the interface 420, internal to the interface 420, through the interface 420, or may extend away from the interface 420 to measure the state of the fluid-impermissible member 410, either internal or external of the fluid-impermissible member 410, or any combination thereof.

Figure 8:
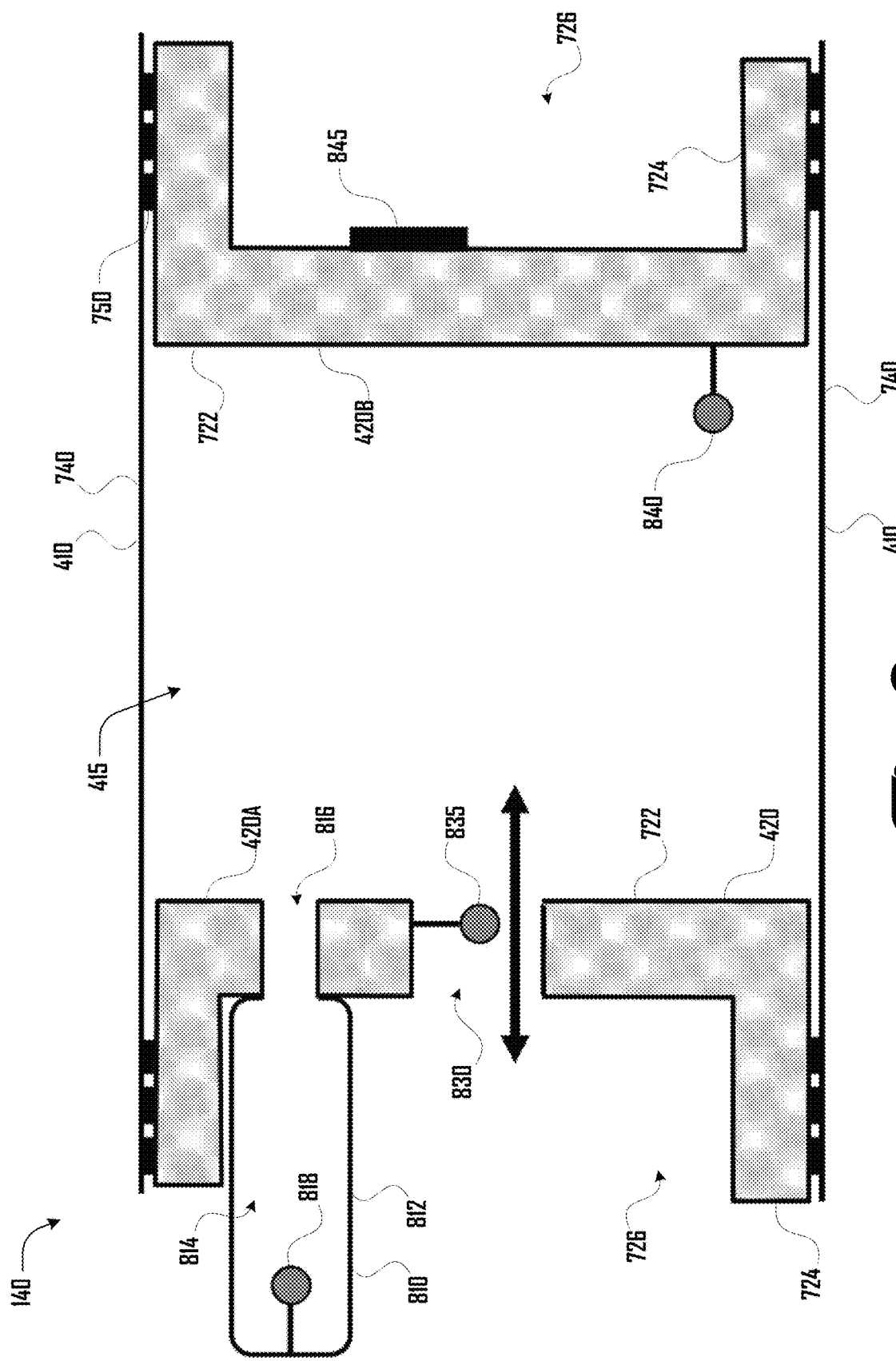
FIG. 8 illustrates a side cross sectional view of an example actuator comprising a plurality of sensors on or about interfaces of the actuator.

For example, FIG. 8 illustrates an example actuator 140 having a first and second interface 420A, 420B that each comprise an interface plate 722 with a lip 724 extending around the perimeter of the interface plate 722 that defines an interface cavity 726. A fluid-impermeable membrane material 740 is coupled to external sidewalls of the interfaces 720 via welds 750 (see also examples of FIGS. 17*a* and 17*b*), which generates the fluid-impermeable member 410 and fluid cavity 415 defined by the interfaces 420 and membrane material 740.

In this example embodiment, the first interface 420A comprises a pressure sensor unit 810 disposed in the interface cavity 726 that includes a body 812 defining a dead volume chamber 814, which communicates with fluid chamber 415 of the fluid impermissible member 410 via pressure-sensor port 816 defined by the interface plate 722 of the first interface 420A. A first pressure sensor 818 within the dead volume chamber 814 can be configured to sense the pressure of fluid within the fluid chamber 415 via the pressure-sensor port 816.

The first interface 420A further comprises a flow port 830 defined by the interface plate 722 of the first interface 420A. As discussed herein, fluid can be introduced to and removed from the fluid chamber 415 via the flow port 830, which can cause the actuator to expand and contract. A temperature sensor 835 can be disposed within the flow port 830, which can be configured to sense the temperature of fluid entering and leaving the fluid chamber 415, the temperature of fluid within the fluid chamber 415, and the like.

The second interface 420B can comprise a second pressure sensor 840 that can be disposed on the interface plate 722 of the second interface 420B with the second pressure sensor 840 extending within the fluid chamber 415 and configured to sense the pressure of fluid within the fluid chamber 415. The second interface 420B can further comprise a strain gauge 845 on the interface plate 722 within the interface cavity 726 of the second interface 420B. The strain gauge 845 can be configured to sense strain associated with the second interface 420B.

In various embodiments, the sensors 818, 835, 840, 845 can be operably connected to a control system 210 of an exoskeleton system 200, with data from the sensors 818, 835, 840, 845 being used to control the exoskeleton system 200 as discussed herein. The example embodiment of FIG. 8 is only provided for purposes of illustration and should not be construed to be limiting on the wide variety of additional embodiments that are within the scope and spirit of the present disclosure. For example, sensors of various suitable types can be disposed in various suitable locations on, in, or about an actuator 140.

Figure 9:
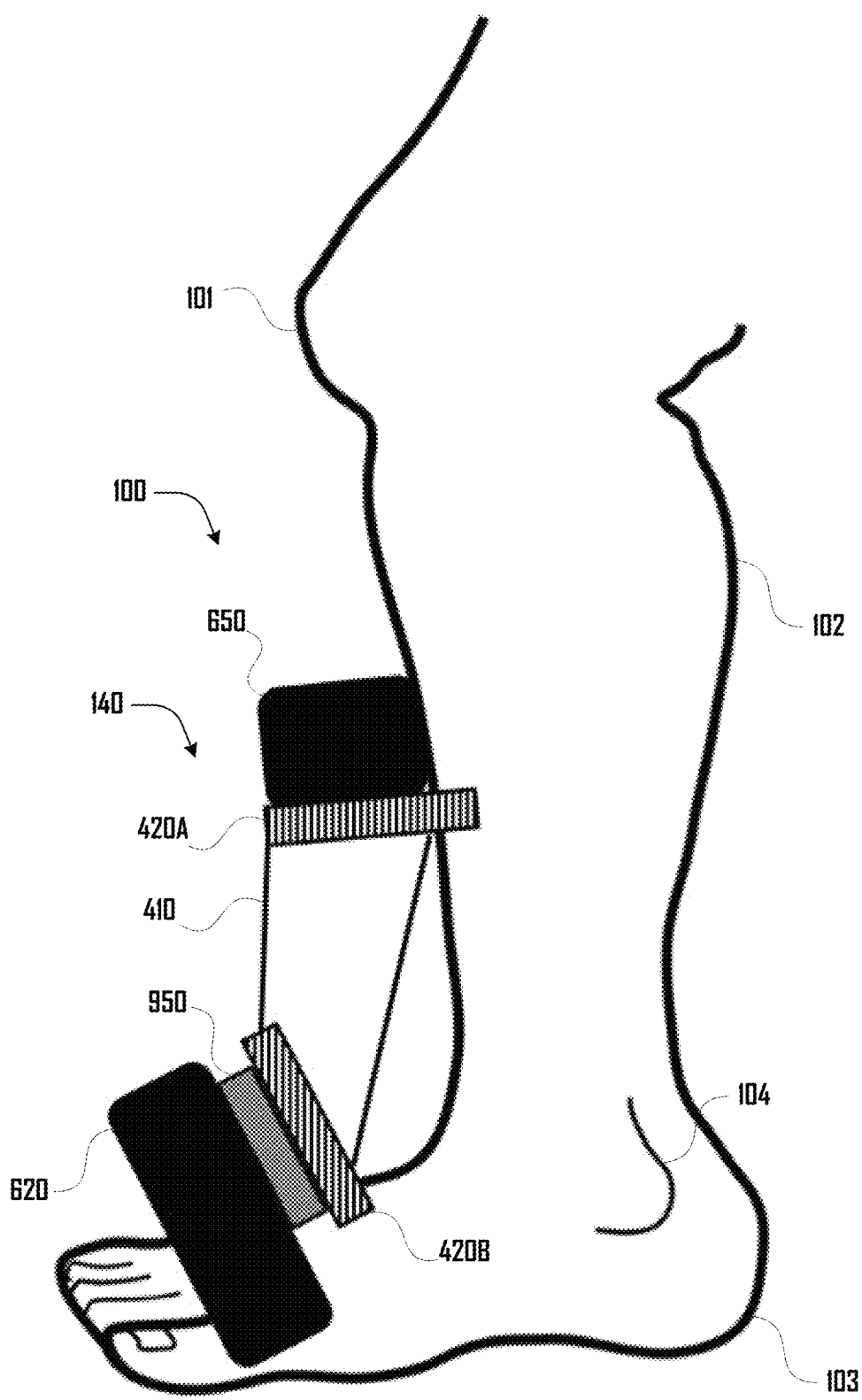
FIG. 9 is a side view of one example embodiment of an actuator coupled to the leg of a user that includes a load cell integrated into an interface that can be configured to measure the force application of the fluidic actuator through an exoskeleton foot structure into the ground.

As shown in the example of FIG. 9, one example embodiment of sensor integration into the interface 420 to measure force output includes a load cell 950 integrated into an interface 420 of a fluidic actuator 140 for an ankle exoskeleton 100 to measure the force application of the fluidic actuator 140 through an exoskeleton foot structure 620 into the ground. For example, FIG. 9 illustrates a fluidic actuator 140 coupled about an ankle 104 of a user 101 having a first and second interface 420A, 420B with the second interface 420B having a load cell 950 coupled between the second interface 420B and the exoskeleton foot structure 620. Another example embodiment of sensor integration into an interface 420 to measure a state of the interface 420 itself includes a strain gauge incorporated with a ring (e.g., plastic ring) that encircles the fluid impermeable member 410 (e.g., a bladder) to measure the strain on the ring interface itself.

In some embodiments, interfaces 420 can comprise integrated features to help with attachment between the fluidic actuator 140 and other bodies such as parts of a user 101 (e.g., leg 102, foot 103, and the like), parts of an exoskeleton 100 (e.g., structures 120, 150, 620, 650 of FIGS. 1 and 6). In some examples, such parts of an exoskeleton 100 can be referred to as retaining bodies. Various features, in some examples, can be configured to locate the fluidic actuator 140 relative to a retaining body. Such features can include but are not limited to molded inserts, snap features, sliding mechanisms, slots, threaded holes, through holes, pins, bosses, debosses, lips, detents, threaded inserts, over-molded screws, magnets, spring-loaded features and the like. When used in conjunction with an exoskeleton 100 in some embodiments, these attachment features of an interface 420 can allow for quick connection or disconnection from an exoskeleton structure (e.g., structures 120, 150, 620, 650 of FIGS. 1 and 6), which can be useful in various embodiments, including when a fluidic actuator 140 fails and needs to be replaced, or the like. One example embodiment of such a quick connection/disconnection feature is a female sliding feature on one or more fluidic actuator interfaces 420 that mates with a male feature on an exoskeleton structure (e.g., structures 120, 150, 620, 650 of FIGS. 1 and 6), allowing for the actuator 140 to be easily slid into and out of the system. Such features can also be used to create more or less secure attachments of the fluidic actuator 140 with a retaining body like an exoskeleton system. One example embodiment of this is the use of molded inserts that mate with holes in an exoskeleton structure (e.g., structures 120, 150, 620, 650 of FIGS. 1 and 6), allowing for locking nuts to be used to secure the fluidic actuator 140 to the exoskeleton structure.

While some embodiments of interfaces 420 can be directly bonded to or otherwise in contact with a fluid-impermeable member 410 (e.g., a bladder, membrane material 740, or the like) to allow for interaction with or by the fluidic actuator 140, in further embodiments other structures can interact with the interface 420. Such structures can be rigid, semi-rigid, flexible, or the like. Such structures may also act to provide for attachment to one or more retaining bodies, which may or may not include one or more retaining bodies with which the interface 420 also interacts. Such structures may also provide support to the fluidic actuator 140 to achieve various objectives.

In one embodiment, the support structure can be used to strengthen a bond between a fluid-impermeable member 410 (e.g., a bladder, membrane material 740, or the like) and the support structure; between a fluid-impermeable member 410 and an interface 420, or any combination and multiple thereof. For example, one embodiment can include a membrane material 740 bonded circumferentially around the sides of an interface 420 (e.g., welded as shown in FIGS. 7, 8, 17a and 17b), and an additional structural element can be used to support that bonding by constraining free membrane material 740 surrounding a bond between the membrane material 740 and interface 420. This may be done in such a way, in some examples, to constrain the membrane material 740 during pressurization such that the membrane material 740 adjacent to the bond does not reach a critical peel angle with the bonded faces of the membrane material 740 and interface 420. Such a critical peel angle can lead to the bond reaching a critical peel state, where the normal component of the tension force, where normal is relative to the bonded faces of the membrane material 740 and interface 420, within the material adjacent to the bond reaches a magnitude that causes the bond to fail in peel.

One example case of this can be where membrane material 740 adjacent to a bond is perpendicular to the bond faces of the membrane material 740 and interface 420, leading to some or all of the tension force within the membrane material 740 contributing directly to peel and subsequent failure of the bond at a certain magnitude of tension. Avoiding such a critical angle and subsequent critical peel state can maintain the bond primarily in a shear state where less failure of the bond can be prone to occur, with some exceptions where the bonding method may be weaker in shear, such as with the use of two flat parallel magnetic faces. It should be noted that avoiding this critical peel state and maintaining bonds primarily in a shear state, and in some examples ideally with all bonds occurring as lap welds and all materials nearest the bonds remaining close to parallel with the bond faces, between the interface and the fluid-impermeable member 410, as well as within the construction of the fluid-impermeable member 410 itself, may be advantageous not only at preventing the failure of those bonds, but may also have an advantage that any coated fabrics being used as a fluid-impermeable membrane material 740 and which participate in any of these bonds may also be loaded primarily in shear nearest the bond.

For example, in various embodiments, the location of shear/lap welds (see e.g., FIG. 14b) along with the geometry of the fluid-impermeable member 410, constraints, and the like, can be configured such that the tension in the membrane material 740 nearest to the weld never exceeds 45 degrees from parallel to the weld such as when the fluid chamber 415 is at a maximum inflation state. Further embodiments can be configured such that the membrane material 740 nearest to shear/lap welds will not exceed 40, 35, 30, 25, 20, 15, 10 or 5 degrees from parallel to the weld.

This can be desirable in some embodiments because some coated fabrics with a fluid-impermeable property can become fluid permeable if the coating and fabric separate, which can occur in some examples from delamination during peel. When a coated fabric participates in a bond, in some examples it can be the coating that is actually directly participating in the bond, then it can be possible for the bond to never reach a critical peel state but for the coating and fabric to still delaminate, creating permeability and failure of the fluid-impermeable member 410. This can be mitigated in various embodiments where the bond is held mainly in shear, as the likelihood of delamination between the coating and the fabric can be reduced in such a loading case.

In some example embodiments, a structural bond support element can take the form of a rigid plate that nests atop the interface 420 and whose sides overlap past the perimeter of the interface 420, such that when a membrane material 740 is bonded around that perimeter (see e.g., example of FIGS. 17a and 17b) to form the fluid-impermeable member 410, the membrane material 740 nearest the bonds along the sides of the interface 420 are captured and prevented from reaching the critical peel state. In other embodiments, such structural support element can comprise a feature in a retaining body by which a bladder interface is captured. For example, in one embodiment, such feature could be a recess within the retaining body, such as an exoskeleton device 100, which captures the interface 420 of the fluidic actuator 140 in such a way as to create a bond-supporting material constraint.

FIGS. 10a and 10b illustrate an example of a support element 1000 that is configured to couple about and support welds 750 between a membrane material 740 and sidewalls of an interface 420. The support element can comprise a central unit 1010 configured to reside within the interface cavity 726 of the interface 420 with a rim 1020 on the edges of the support element defining a coupling slot 1030 along with the central unit 1010. The lip 724 of the interface 420 along with the welds 750 and a portion of the membrane material 740 can be configured to be coupled within the coupling slot 1030, which can support the welds 750 as discussed herein. It should be noted that while the example of FIG. 10a illustrates elements spaced apart for clarity, in various embodiments, the lip 724, welds 750 and membrane material 740, can engage internal faces of the coupling slot 1030 defined by the central unit 1010 and rim 1020, which can provide a secure friction fit that supports the welds 750 as discussed herein.

As shown in the example of FIG. 10b, where the impermeable member 410 is inflated with pressurized fluid, the membrane material 740 can expand outward compared to the flat configuration of FIG. 10a, and a portion of the membrane material 740 proximate to the weld 750 can engage an end 1022 of the rim 1020 of the support element 1000, which can allow the portion of the membrane material 740 at the weld 750 to remain parallel to the face of external face of the interface 420, which can prevent non-shear forces on the weld 750, which could result in failure of the weld 750.

For example, FIG. 10c illustrates an example where a weld 750 has failed with a portion of membrane material 740 decoupling from the interface 420. In contrast to FIG. 10b, where a support element 1000 supports the weld 750, in the example of FIG. 10c, the inflation of the impermeable member 410 can cause the membrane material 740 at the weld 750 to assume a critical peel state, which can cause the weld 750 to fail due to peeling, delaminating or other separation of the membrane material 740 from the sidewall of the interface 420.

Other embodiments of a structural bond support element can include but are not limited to an element that has a region where the membrane material 740 is purposefully unconstrained during inflation of the impermeable member 410, such that the impermeable member 410 does fail at a prescribed condition. One embodiment of a flexible structural feature can include constrained membrane material 740 near a bond (e.g., a weld 750) at lower pressures in order to maintain a primarily shear loading state in the bond, but then flexes at higher pressures to allow the membrane material 740 to hew towards perpendicular to the bond, leading to the critical peel loading state and subsequent failure as the bond peels apart. Such an embodiment can be desirable in some examples for safety to prevent the impermeable member 410 from reaching certain undesirable pressures or volumes by providing for failure of a bond to release fluid from the fluid cavity 415 of the impermeable member 410.

Such a prescribed failure mode can have various other potential applications, including but not limited to allowing for near instantaneous collapse of the impermeable member 410 to allow any body supported by the impermeable member 410 to also collapse; to allow for a slow leak that allows for a slow collapse over time; for the expulsion of the internal fluid itself to cause a desired effect such as pushing an object away from the impermeable member 410 or to propel the impermeable member 410 in a direction, and the like.

In some embodiments, a fluid-impermeable member 410, (e.g., a bladder defined at least in part by membrane material 740), can be used to constrain a pressurized fluid whose function is to create an applied force or moment or to act as a volume or positioning element. Forces and moments may be transferred through one or more interface 420, the fluid-impermeable member 410, a supporting structural element, or some combination thereof. The fluid-impermeable member 410 may also comprise the fluidic actuator 140 simultaneously, such as in some cases when interfaces 420 and fluid-impermeable membrane materials 740 are integrated to form the fluid-impermeable member 410, such that if by removing any, all, one or more than one interface 420 would result in the fluid-impermeable member 410 no longer being fluid-impermeable. In some embodiments, the fluid-impermeable member 410, also called a bladder, can consist of or consist essentially of a fluid-impermeable membrane material 740, such as a coated fabric, or the like.

The flexible fluid-impermeable member 410 (e.g., comprising membrane material 740 and/or a portion of one or more interfaces 720 that define a fluid-impermeable fluid cavity 715) may take on any suitable geometry with varying lengths, shapes, sizes, orientations of shapes/volumes, combinations of shapes/volumes, segmentation, repetitions of volumes, amorphous geometries, etc. To create such a geometry, a fluid-impermeable membrane material 740 may be manipulated by a number of different methods, including but not limited to cutting with a blade and/or laser, stamping, folding, stitching, melting, burning, bonding, adhering, stapling, enveloping, tying, etc. Some embodiments of geometries, of which a fluid-impermeable member 410 (e.g., a bladder) may incorporate one or more combinations or repetitions of, in any orientations, include, but are not limited to, tubes, cylinders, pyramids, ovoids, toruses, toroids, cubes, spheres, bubbles, teardrops, frustums, cones, of various sizes, dimensions, volumes, lengths, variations, asymmetries, etc.

Figure 11A:
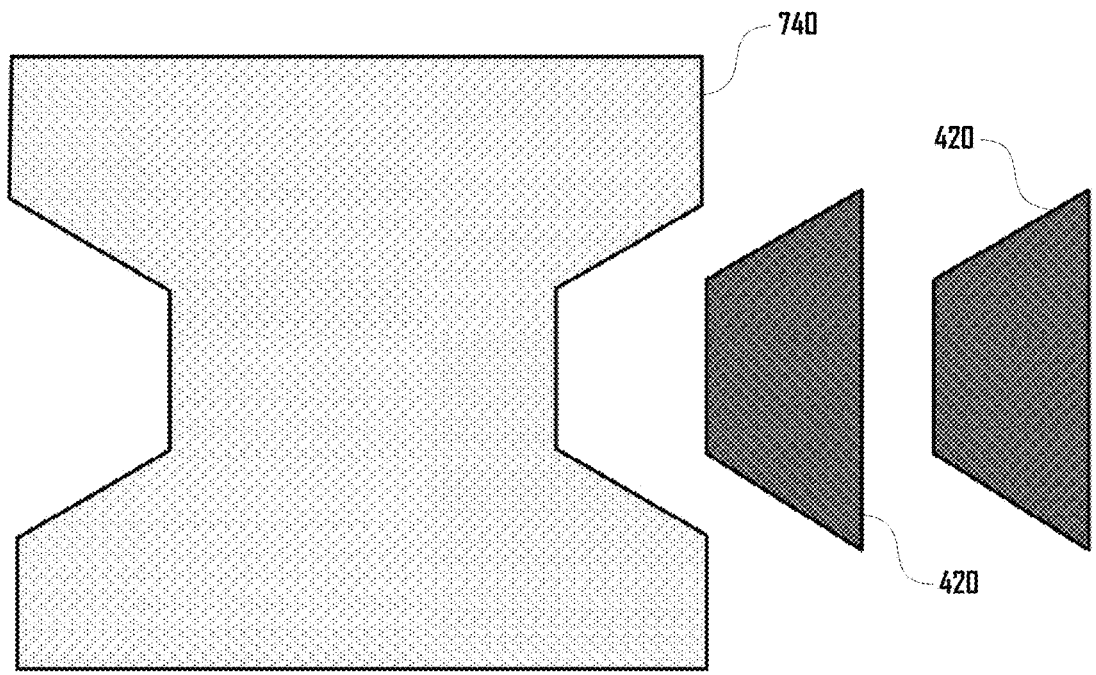
FIG. 11a illustrates an example embodiment of a fluid-impermeable membrane material and a pair of interfaces.
Figure 11B:
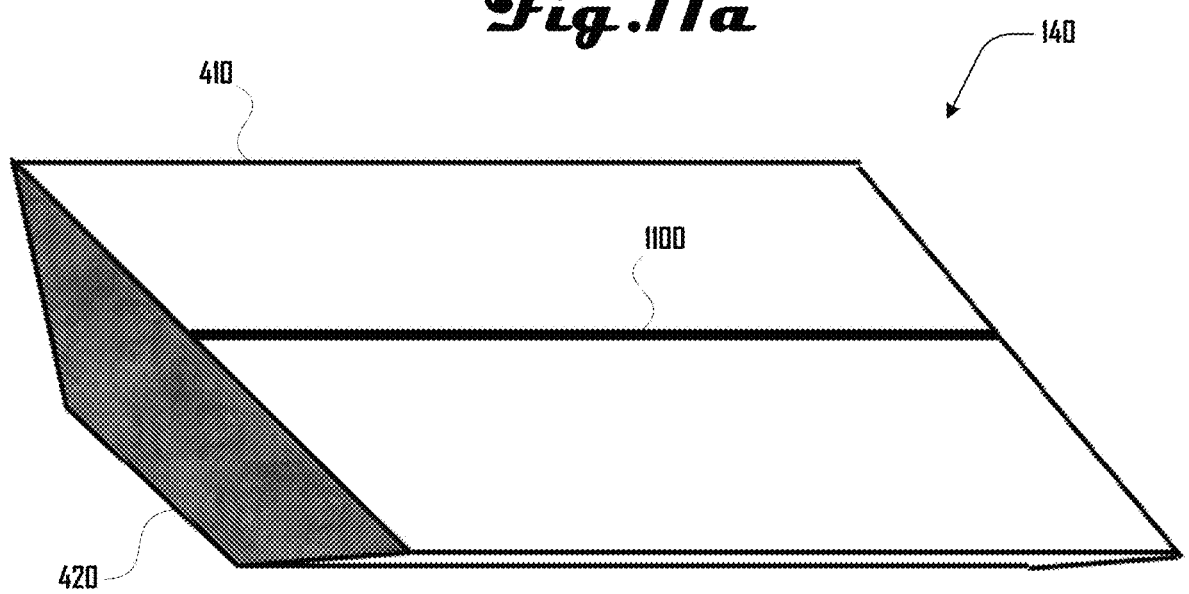

In one embodiment, generating the geometry of the fluid impermeable member 410 can comprise laser cutting a 2-D pattern onto a flat fluid-impermeable membrane material 740, such as a coated fabric, and then using bonding techniques including but not limited to heat welding, sonic welding, RF welding, impulse welding, adhesives, and/or mechanical fasteners, which in some examples can be in conjunction with two hard plastic interfaces 420 to create a three-dimensional trapezoidal prismatic geometry. This can be achieved in some examples by bonding the fluid-impermeable membrane material 740 to generate a tube of and then bonding hard interfaces 420 shaped as trapezoids onto ends of the tube of fluid-impermeable membrane material 740. In such an example, the fluid-impermeable membrane material 740 and interfaces 420 can form the fluid impermeable member 410 and the fluidic actuator 140 simultaneously with portions of the fluid-impermeable membrane material 740 and interfaces 420 defining a fluid cavity 415 of the fluid impermeable member 410. For example, FIG. 11a illustrates an example embodiment of a fluid-impermeable membrane material 740 and a pair of interfaces 420 that can be coupled together to generate a fluidic actuator as shown in FIG. 11b. As discussed herein the fluid-impermeable membrane material 740 can be folded into a tube and welded together to generate a weld 1100 with the interfaces 420 coupled on opposing ends of the membrane material 740 to generate a fluid impermeable member 410 that defines a fluid cavity 415. As discussed herein, the term tube or tube configuration should not be construed to be limiting on circular or rounded tubes and such terms should be construed to encompass elongated circumferences (e.g., of fluid-impermeable membrane material 740), which may or may not have open ends. The length of such a tube or tube configuration can have a consistent cross-sectional shape and size or can be of varied shape and size. Additionally, in some embodiments, a tube or tube configuration can comprise convolutions or a smooth face.

In further examples, FIGS. 17a and 17b illustrate top view of a fluidic actuator 140 having an interface 420 with membrane material 740 coupled about an edge of the interface 420 via a weld 750. FIG. 17a illustrates a trapezoidal interface 420 and FIG. 17b illustrates a rectangular interface 420; however, various further embodiments can have interfaces 420 of any suitable shape and in some examples, the interfaces 420 can be different shapes or the same shape.

In some embodiments, a fluid impermeable member 410 can generated by coupling a plurality of stacked sheets of fluid-impermeable membrane material 740. For example, as shown in the example of FIGS. 12a, 12b and 12c, a method of one embodiment can include generating (e.g., by laser cutting) multiple copies of a first shape 1210 with an opening 1215 in the middle of the first shape 1210 out of a flat fluid-impermeable membrane material 740, such as a coated fabric. A second shape 1230 can be generated having the same size as the first shape 1210, but with the opening 1215 being absent. An example of two of the first shape 1210 and two of the second shape 1230 are shown in FIG. 12*a*.

A fluid impermeable member 410 as shown in the example of FIGS. 12*b* and 12*c* can be generated coupling by the four sheets of FIG. 12*a* together. For example, the two first shapes 1210 can be stacked on top of each other and bonded together along internal edge B1 to generate a first coupling 1250A between the first shapes 1210. A second coupling 1250B can be made by bonding one of the second shapes 1230 to one of the first shapes 1210 about edge A1 and a third coupling 1250C can be made by bonding the other one of the second shapes 1230 to the opposing one of the first shapes 1210 about edge A2. FIG. 12*b* illustrates a side view and FIG. 12*c* illustrates a cross-sectional side view of the fluid impermeable member 410 that can be generated via such couplings and FIG. 12*c* illustrates that the generated fluid impermeable member 410 can define an enclosed fluid cavity 415. The configuration of FIGS. 12*b* and 12*b*, or a portions thereof can be considered to be a "tube" or "tube configuration" as discussed herein. Accordingly, by a combination of bonding around outer edges A1, A2 and the middle edges B1 of the first shape 1210, it is possible to create a multi-segmented fluid impermeable member 410, similar to an accordion or bellows. In various embodiments, such a fluid impermeable member 410 can then be attached to two interfaces 420 to generate a fluidic actuator 140.

The geometry and configuration of a fluidic actuator 140, fluid impermeable member 410, one or more interfaces 420, membrane material 740, and the like, can be designed to generate motion and/or force application in one, two, or more directions and/or apply a moment about any axis or combination of axes, including an instantaneous axis, series of instantaneous axes, and infinite axes. Given a pressurized fluid within the fluid cavity 415, the fluid impermeable member 410 (e.g., a bladder) can be designed in some examples to apply a near-constant force application or varying forces dependent upon the inflation/expansion/contraction state of the fluid impermeable member 410, the geometry and/or the construction of the interfaces 420, and the like. Moments can be created by the actuator 140 in various ways including but not limited to methods which constrain the expansion/contraction of the fluid impermeable member 410 such that there is unequal extension/contraction of one face of the fluid impermeable member 410 relative to another face. This inequality can cause the fluid impermeable member 410 to rotate about an axis or set of axes (which may include an instantaneous or infinite axis—e.g. linear motion), with the resulting output forces at the ends of the fluid impermeable member 410 creating a moment about the aforementioned axes.

One embodiment of such a constraint can include the use of an elastic, semi-elastic, inextensible, or some combination thereof, strap or other length constraining element, such as a bungee, string, rope, or cable, to constrain the expansion of one side of the fluid impermeable member 410 relative to another during pressurization. One example embodiment of the use of a strap includes a strap that connects from one end of an interface 420 to another opposing interface 420 and lies across the body of the fluid impermeable member 410. This strap can be shorter in length than the longest dimension of the fluid impermeable member in the direction of expansion during inflation. As the fluid impermeable member inflates, this strap can engage prior to maximum inflation, causing the side of the fluid impermeable member 410 nearest and underneath the strap to resist or stop expansion. Due to this constraint, one side of the fluid impermeable 410 member can expand more than the other, causing the fluid impermeable member 410 to expand in an arc. In other embodiments, a strap or combination of straps, can connect from one, two, or more of the interfaces 420 of the fluidic actuator to one, two, or more of any of the other interfaces 420 of the fluidic actuator to create such a constraint. In other embodiments, a strap or combination of straps could connect from one or more sub-chambers of the fluid impermeable member 410 to one or more other sub-chambers of the same fluid impermeable member 410 to create this constraint. In other embodiments, a strap or combination of straps could connect from one, two or more of the interfaces 420 of the fluidic actuator 140 to any other body, such as an exoskeleton structure, to create such a constraint. In other embodiments, a strap or combinations of straps can connect from any part of the fluidic actuator 140, including the fluid impermeable member 410, to any other part of the fluidic actuator 140 or other body, such as an exoskeleton structure or one, two or more other fluidic actuators 140, to create such a constraint. In other embodiments, a strap or combination of straps connect to themselves while surrounding the fluid impermeable member 410 to create such a constraint.

For example, FIG. 21*a* illustrates a side cross-sectional view of an example embodiment of an actuator 140 comprising a fluid chamber 415 having a first and second sub-chamber 415A, 415B defined by first and second welds 750A, 750B that couple portions of membrane material 740 at external edges of the fluid impermeable member 410. As shown in this example, one or more straps 2110 can be coupled to portions of membrane material 740 about the first and second welds 750A, 750B, which can constrain expansion of the fluid chamber 415 including the first and second sub-chambers 415A, 415B.

In another example, FIG. 21*b* illustrates a side view of an example embodiment of an actuator 140 comprising straps 2130 coupled to and extending between a pair of opposing interfaces 420, which can constrain expansion of a fluid impermeable member 410 between the interfaces 420. Such straps 2130 can be coupled to various suitable portions of the interfaces 420 including external top faces, sidewalls, an underside, or the like. In some embodiments, such straps 2130 can be disposed circumferentially about the some or all of the perimeter of the actuator 140.

Additionally, in various embodiments, such straps 2110, 2130 can be different lengths, which may be desirable for constraining different portions of the actuator 140. For example, straps of a first length on one side of the actuator 140 with straps 2130 of a second longer length on another side of the actuator 140 can allow differential expansion of the actuator 140 such that the interfaces 420 can be disposed at an angle to each other at various inflation states of the fluid impermeable member 410. Such differential expansion via straps 2130 can be in addition to or in place of differential expansion based on different lengths of membrane material 740 on different portion of the actuator 140 (see e.g., FIGS. 13*a-c*). As discussed herein, such differential expansion can cause the actuator 140 an arc configuration, curve configuration or the like, at various inflations states including at a maximum inflation state of the actuator 140, and the like.

Also, while the example of FIG. 21*b* shows vertical straps 2130 extending between the interfaces 420, various embodiments can comprise one or more lateral straps that are looped or wrapped about the fluid impermeable member 410 as discussed herein. Additionally, various embodiments can comprise any suitable plurality of strapping configurations, so the examples herein showing a single strapping configuration such as FIGS. 21a and 21b should not be construed as limiting.

One example embodiment of such a constraint can include the use of high-tension strings/cables tying together flaps along one side of a segmented fluid impermeable member 410, such that during expansion, the tied side of the segmented fluid impermeable member 410 is constrained more than the opposing side of the fluid impermeable member 410. As the fluid impermeable member 410 is pressurized, due to the constraint, one side of the fluid impermeable member 410 can expand more than the other, causing the fluid impermeable member 410 to expand in an arc.

For example, in some embodiments, a fluid chamber 415 of the fluid impermeable member 410 defines a plurality of sub-chambers, including a first and second sub-chamber. Inflation of the fluid chamber 415 applying a force to a first and second planar interface 420 can include maintaining the first sub-chamber at a static pressure and dynamically pressurizing the second sub-chamber.

In various embodiments, a multi-chamber fluid chamber 415, a fluid chamber 415 having a plurality of sub-chambers or segments, or the like, can be used pressurized working fluid more efficiently over a dynamically changing large range of motion by keeping one chamber filled to a static pressure and another chamber dynamically pressurized. A fluidic actuator 140 can include a structure that allows for static or dynamic segmentation of the fluid impermeable member 410, such that the fluid flow and pressure within each segment and/or between segments can be controlled, whether independently or dependently.

For example, dynamic segmentation can allows for one segment to be held at a quasi-static pressure and/or controlled dynamically and another or multiple other segments whose pressure can also be held at a quasi-static pressure and/or controlled dynamically, such that the interaction of these segments allows for efficient use of fluid, indicated by minimizing fluid flow into or out of any given segment, of pressurized fluid over a large dynamically changing range of motion of the fluid actuator 140 where the fluid actuator 140 may need to act over a small range of motion or a large range of motion, where a small range of motion is defined as less than half of the overall range of motion, and a large range of motion is defined as half or more of the overall range of motion, or any combination thereof. Overall ranges of motion for a fluid actuator 140 when related to moving two or more bodies relative to each other about an axis or set of axes can be described as varying between an angle of 0 degrees and 360 degrees or more about an axis or about each axis within a set of axes, where the angle is described as the angle formed between any pair of bodies whose motion is influenced by the actuator, where the measurement reference point of each body can be any fixed point relative to the body, such as a center of mass, corner, vertex, or even a point in 3D space fixed relative to each body, and an axis of rotation, and can be measured in either a clockwise or counterclockwise direction about an axis or each axis within the set of axes, and where angles greater than 360 degrees are associated to ranges of motion where a pair of bodies has made more than a single rotation about the axis, with some example overall ranges of motion being 720 degrees, 540 degrees, 360 degrees, 270 degrees, 180 degrees, 150 degrees, 120 degrees, 90 degrees, 60 degrees, 30 degrees, 10 degrees, and 0 degrees and the like. Overall ranges of motion for a fluid actuator 140 when related to moving two or more bodies relative to each other whose distances are measured from each other linearly, where those distance measurements can be measured from any fixed point relative to each body, such as a center of mass, corner, vertex, or even a point in 3D space fixed relative to each body, can vary from a length of 0 in to 6 ft or more, with some examples being 0.5 in, 1 in, 2 in, 3 in, 4 in, 5 in, 6 in, 6.5 in, 8 in, 10 in, 12 in, 14 in, 24 in and the like. The overall ranges of motion for a fluid actuator 140 can be described with linear measurements, rotational measurements, or any combination therein.

Other constraint methods can include, but are not limited to, the use of strapping of unequal lengths attached to different sides of a fluid impermeable member 410, between different interfaces 420, between interfaces and the fluid impermeable member 410, between any part of the fluidic actuator 140 and itself, between parts of the fluidic actuator 140 and other bodies, and any combination thereof, the geometry of the fluid-impermeable member 410 itself where one or more sides of the fluid impermeable member 410 are unequal in dimension, and the like.

One example embodiment where the geometry creates such a constraint can be a fluid impermeable member 410 that inflates into the shape of a trapezoidal prism. As this fluid impermeable member 410 inflates, once the short side of the trapezoidal prism is at its max length, it can no longer expand on that side. The opposing longer side of the fluid impermeable member 410 can continue to expand, causing the ends of the fluid impermeable member 410 to no longer be parallel and can instead be at an angle with each other. In rotating from parallel to at an angle with each other, the ends of the fluid impermeable member 410 can create a moment about an axis.

For example, FIGS. 13a, 13b and 13c illustrate an example embodiment of a fluidic actuator 140 having a first and second opposing interface 420 with a membrane material 740 coupled thereto, which defines a fluid impermissible member 410 and a fluid chamber 415. The example actuator is shown having first and second sides S1, S2 with the first side S1 being shorter than the second side S2. As shown in FIG. 13a, the interfaces can be in a parallel configuration where both sides S1, S2 are in a collapsed configuration (e.g., due to pressure of fluid within the fluid chamber 415, force applied to the interfaces 420, or the like), which can cause membrane material 740 on the sides S1, S2 to bulge outward. FIG. 13b illustrates a configuration of the actuator 140 where the interfaces 420 are in a parallel configuration where the first side S1 has reached a maximum length, whereas the second side S2 has not reached a maximum length. FIG. 13c illustrates a configuration of the actuator 140 where both the first and second sides S1, S2 have reached a maximum length such that the interfaces 420 are disposed at an angle A.

In some embodiments the membrane material 740 can comprise an inextensible yet flexible material (see e.g., FIG. 5), which allows the membrane material 740 to be flexible (e.g., S1 and S2 in FIG. 13a and S2 in FIG. 13b) and become inextensible or substantially inextensible at a maximum length (e.g., S1 and S2 in FIG. 13c and S1 in FIG. 13b). FIGS. 4a and 4b illustrate another example of a fluidic actuator 140 that can expand differentially based on different lengths or geometries of a membrane material 740 or fluid impermissible member 410.

In various examples, such moment generation by a fluidic actuator 140 can be useful in applications for body worn devices such as orthotics or exoskeletons 100, where assistive torque application about various joints such as the ankle, knee, hip, and elbows can provide useful assistance to the user. Different combinations of length, angle, and size can allow for fine-tuning adjustments and customizations of the desired actuator torque and force direction and magnitude over inflation time.

In some embodiments, force output can be a function of, but not limited to, the contact surface area of the fluid impermissible member 410 (e.g., a bladder) against a body (upon which the force is being applied such as one or more portion of an exoskeleton or directly to one or more portion of a body of a user); the contact area of the fluid impermissible member 410 against one or more interface 420; the contact area of the fluid impermissible member 410 against itself, as well as the fluidic pressure at those contact areas. If that contact area can be made to grow or diminish as the actuator 140 inflates and/or deflates, it can be possible in some examples to alter the force output of the actuator 140 through in such a way rather than through changing the fluidic pressure in a fluid chamber 415 alone. Some embodiments can include an interface 420 with a geometry and construction that can allow for variation in the contact area, which can be accomplished in various suitable ways, including but not limited to one or more interface 420 flexing as the fluid pressure/volume within the fluid chamber 415 of the fluid impermissible member 410 changes, and where such flexing causes a contact area of the interface 420 with another body to change. Further embodiments can include one or more interface 420 with sliding elements that can allow the interface 420 to change contact area by the one or more interface 420 itself growing or shrinking in surface area, or simply by changing the orientation of the interface 420 against another body which may allow for a change in the contact surface area.

Some embodiments can include a fluid-impermeable member 410 with variable cross-sectional area and/or asymmetric shape as well as multiple fluid-impermeable members 410 with these characteristics that work in series, parallel or any combination thereof. One embodiment can include a contact area with another body that is greater when the fluid-impermeable member 410 is compressed and reduces as the fluid-impermeable member 410 expands. The converse can also be present in some embodiments. Such an embodiment in some examples may provide more force during the beginning of inflation rather than the end at a given fluidic pressure which in some examples can be useful in applications where the timing of that force application is useful, such as in a wearable exoskeleton that assists with walking and running gaits. One example embodiment can include fluid-impermeable member 410 (e.g., a bladder) whose geometry is a cone. When collapsed, such a fluid-impermeable member 410 can have a contact area with another body equal to or greater than the base of the cone. As the cone expands, if the body is in contact with the pointed end of the cone, the cross-sectional area of the cone in contact with the body can shrinks. Another example embodiment can include a fluidic actuator 140 comprising of two opposing interfaces 420 on either end of a fluid-impermeable member 410 having a geometry of diminishing cross section, such as a conical or pyramidal frustum. A conical or pyramidal frustum can, in general, have one side that is larger in surface area than the opposing side, referred henceforth in this example as base and top, respectively. While the interfaces 420 can be of the same geometry and dimension, the fluid-impermeable member 410 can have a larger cross-sectional area at a connection to an interface 420 at the base of the frustum and a smaller cross sectional area at a top interface 420. Regardless of geometry, in some embodiments it is possible in the collapsed state for the cross sectional contact area of the fluid-impermeable member 410 with the two interfaces 420 to actually be greater than the maximum created at full inflation of the fluid-impermeable member 410, as the fluid-impermeable member 410 can balloon circumferentially during inflation when the two interfaces 420 can be close in proximity in the collapsed state due to the flexibility of a fluid-impermeable membrane material 740 that is part of the fluid-impermeable member 410. Expanding in this circumferential direction can lead to increased contact area with the two interfaces 420. As the fluid chamber 415 of the fluid-impermeable member 410 inflates from a pressurized fluid, the interfaces 420 can move away from each other and the contact area of the fluid-impermeable member 410 with the interfaces can reduce. This can create the effect of a variable force output of the fluid-impermeable member 410 without the need to manipulate the pressure of the working fluid. In the case of the frustum, this variable force output can be a reduction as the fluid-impermeable member 410 expands, whose reduction can in some examples be controlled by controlling the geometry of the frustum.

Another similar example embodiment can comprise a bladder geometry that resembles two frustums connected at their tops, resulting in an inflated fluid-impermeable member 410 with a minimum cross sectional area at a mid-plane of the fluid-impermeable member 410. In this way, a similar effect can achieved in some examples with a reduction in cross-sectional area during inflation/expansion of the fluidic actuator 140, which can results in a reduction of output force at a given pressure in some embodiments.

Such examples can be extrapolated to further embodiments having any suitable segmented fluid-impermeable member 410 geometry, whether the segments of the fluid-impermeable member 410 are created by one or more interface 420, supporting structural elements, with a fluid-impermeable membrane material 740 itself, or any combination thereof. In some examples, segmentation of the fluid-impermeable member 410 can include a variable cross-section within the fluid-impermeable member 410 (e.g., within a bladder), including a slight or insubstantial change in cross-section, and similar variable force outputs may be achieved in some examples without necessitating the need for manipulating the pressurization of the working fluid.

In various embodiments, a fluid-impermeable member 410 can comprise membrane materials 740 such as coated synthetic fabrics, elastomers, urethanes, silicones, rubbers, natural textiles, and the like. Such membrane materials 740 can be compliant, semi-compliant, or non-compliant engineering materials that have fluid-impermeable or near fluid-impermeable properties. In various embodiments, a fluid-impermeable member 410 and/or membrane materials 740 can experience low strain once inflated to full volume and especially at high pressure, meaning that in some examples, the fluid-impermeable member 410 and/or membrane material 740 does not stretch significantly at high pressures, giving similar actuator volumes over a range of pressures. This can be in contrast to the example of a rubber party balloon, whose volume can be highly dependent on a fluid volume and pressure and can fail at high pressures due to excessive strain in the material. Accordingly, in some embodiments it can be desirable for a fluid-impermeable member 410 and/or membrane material 740 to comprise an inextensible yet flexible material as discussed herein.

In some embodiments, fluid-impermeable member 410 can be defined at least in part by a membrane material 740 having a plurality of layers. For example, a membrane material 740 can comprise an internal first layer that defines a fluid cavity 415 and can comprise an outer second layer with a third layer disposed between the first and second layers. Throughout this example, the use of the term 'layer' to describe the construction of the membrane material 740 should not be viewed as limiting to the design. The use of 'layer' can refer to a variety of designs including but not limited to: a planar material sheet, a wet film, a dry film, a rubberized coating, a co-molded structure, and the like.

In some examples, the internal first layer can comprise a material that is impermeable or semi-permeable to the actuator fluid (e.g., air) and the external second layer can comprise an inextensible yet flexible material as discussed herein. For example, as discussed herein, an impermeable layer can refer to an impermeable or semi-permeable layer and an inextensible layer can refer to an inextensible or a practically inextensible layer.

In some embodiments comprising two or more layers, the internal layer can be slightly oversized compared to an inextensible outer second layer such that the internal forces can be transferred to a high-strength inextensible outer second layer. One embodiment comprises an impermeable member 410 made with a membrane material 740 having an impermeable polyurethane polymer film inner first layer and a woven nylon braid as the outer second layer.

An impermeable member 410 and/or a membrane material 740 can be constructed in various suitable ways in further embodiments, which can include a single layer design that is constructed of a material that provides both fluid impermeability and that is sufficiently inextensible. Other examples can include a complex bladder assembly that comprises multiple laminated layers that are fixed together into a single structure. In some examples, it can be desirable to limit the deflated stack height of the bladder to maximize the range of motion of the fluidic actuator 140. In such an example, it can be desirable to select a low-thickness fabric that meets the other performance needs of the fluidic actuator 140.

In yet another embodiment, it can be desirable to reduce friction between the various layers of a membrane material 740. In one embodiment, this can include the integration of a third layer that acts as an anti-abrasive and/or low friction intermediate layer between the first and second layers. Other embodiments can reduce the friction between the first and second layers in alternative or additional ways, including but not limited to the use of a wet lubricant, a dry lubricant, or multiple layers of low friction material. Accordingly, while the above example illustrates an embodiment comprising three layers, further embodiments can include any suitable number of layers, including one, two, three, four, five, ten, fifteen, twenty five, and the like.

Such one or more layers can be coupled together along adjoining faces in part or in whole, with some examples defining one or more cavity between layers. In such examples, material such as lubricants or other suitable fluids can be disposed in such cavities or such cavities can be effectively empty. Additionally, as described herein, one or more layers (e.g., the third layer) need not be a sheet or planar material layer as discussed in some examples and can instead comprise a layer defined by a fluid. For example, in some embodiments, the third layer can be defined by a wet lubricant, a dry lubricant, or the like.

The inflated shape of the fluid impermeable member 410 can be important to the operation of the fluidic actuator 140 and/or exoskeleton 100 in some embodiments. For example, the inflated shape of the fluid impermeable member 410 can be affected through the design of both an impermeable and inextensible portion of the fluid impermeable member 410 (e.g., the first and second layer). In various embodiments, it can be desirable to construct one or more of the layers of the fluid impermeable member 410 out of various two-dimensional panels that may not be intuitive in a deflated configuration.

In some embodiments, one or more fluid-impermeable layers can be disposed within the fluid cavity 415 and/or the fluid impermeable member 410 can comprise a material that is capable of holding a desired fluid (e.g., a fluid-impermeable first internal layer as discussed herein). The fluid impermeable member 410 can comprise a flexible, elastic, or deformable material that is operable to expand and contract when the fluid impermeable member 410 is inflated or deflated as described herein. In some embodiments, the fluid impermeable member 410 can be biased toward a deflated configuration such that the fluid impermeable member 410 is elastic and tends to return to the deflated configuration when not inflated.

Additionally, although some embodiments of a fluid impermeable member 410 shown herein are configured to expand and/or extend when inflated with fluid, in some embodiments, fluid impermeable member 410 can be configured to shorten and/or retract when inflated with fluid in some examples.

In various embodiments, a fluid-impermeable member 410 can be constructed of one or more fluid-impermeable membrane materials 740 and/or one or more fluid-impermeable interfaces 420. Such components can be bonded together to define one or more fluid chamber 415 comprising one or more closed volumes capable of being pressurized with fluid as discussed herein. Any suitable bonding method can be used including but not limited to heat welding, radio-frequency welding, adhesives, epoxies, mechanical bonds, and other joining methods and any combination thereof, including permanent or semi-permanent bonds. Such bonding methods may be assisted with the use of supporting components which can include but are not limited to fixturing jigs, dies, clamps, tapes, adhesives, mechanical fasteners, and the like, which can serve the purpose of: focusing the application of the bonding method; locating materials relative to each other to provide more accurate bonding; acting as a heat sink to cool those bonds that require heating to prevent materials from shifting relative to each other during cooling; applying pressure to bonds during cooling of the bond to create stronger bonds, and the like. Such a bonding process can comprise use of locating features in the components such as the fluid-impermeable member 410 and/or interface(s) 420, including pins, holes, screws, bosses, debosses, slides, tracks, hooks, clips, and other features that can have a male/female relationship that can aid with locating two components relative to each other.

In some embodiments, the fluid-impermeable member 410 comprises, consists essentially of or consists of two opposing rigid plate interfaces 420 bonded to a tube of a fluid-impermeable membrane 740. In one example embodiment, such bonding can be done partially or entirely with lap joints, which can be configured to maintain loading at the joints primarily in shear rather than peel during pressurization. In another example embodiment, such bonds can include lap and/or peel welds. For example, FIG. 14*a* illustrates an example of a peel weld 750 between a first and second element 1410, 1420 and FIG. 14*b* illustrates a lap weld between a first and second element 1410, 1420. In various embodiments, the first and/or second element can include a membrane material 740, interface 420, or the like.

Figure 15:
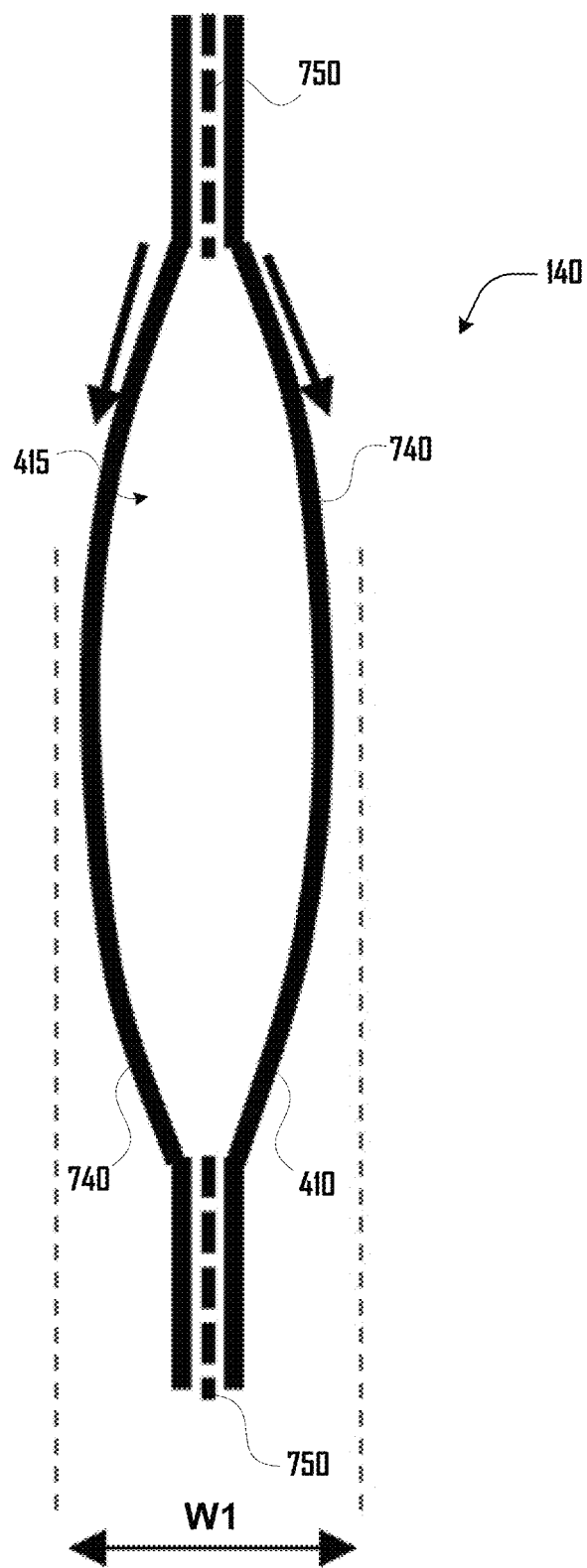
FIG. 15 illustrates an example embodiment of a fluid impermeable member comprising a first and second portion of membrane material coupled together via welds to define a fluid chamber.

In some examples where peel welds are used, such welds can be supported during inflation, especially at high pressure, with support structures as discussed herein, as well as by other suitable structures or methods of preventing the material adjacent to the peel welds from reaching a critical peel angle. This can be accomplished in some examples by controlling the inflation of a fluid impermeable member 410 in such a way as to hold membrane material 740 adjacent to a bond close together during inflation fluid impermeable member 410, such that tension within the membrane material 740 can hew closer to parallel with the bond and not reach a critical peel state. For example, FIG. 15 illustrates an embodiment of a fluid impermeable member 410 comprising a first and second portion of membrane material 740 coupled together via welds 750 to define a fluid chamber 415. By constraining the inflation of the fluid impermeable member 410 to a maximum width W1, can minimize the normal component of a tension force relative to the welds 750, which can minimizes peeling of the peel welds 750.

Limiting the inflation volume, bulging, ballooning or lateral expansion of a fluid impermeable member 410 (e.g., a bladder) can be done with various suitable constraints. Some example embodiments can include the use of straps, ropes, strings, cables or the like, to constrain the geometric expansion of a fluid impermeable member 410 to create such a constraint. Such straps, ropes, strings, cables, or the like can be wrapped around a fluid impermeable member 410 creating this constraint. For example, a strap can be helically wrapped around a fluid impermeable member 410 along a length of a fluid impermeable member 410 or one or more loops of strapping can be disposed around a length of the a fluid impermeable member 410. In further examples, such constraints can be internal to the fluid impermeable member 410, such as within a fluid chamber 415, and can be attached between two or more faces of the fluid impermeable member 410 to constrain the faces from moving away from each other during pressurization.

Such constraints can also be used to constrain the fluid chambers 415 of a multi chambered bladder from expanding too much by restricting the expansion of the entire fluid impermeable member 410 or between fluid chambers 415 of the fluid impermeable member 410. For example, FIGS. 16a and 16b illustrate a fluid impermeable member 410 defined by portions of a membrane material 740 coupled together at a plurality of welds 750 to define a fluid chamber 415 having a first and second fluid chamber portion 415A, 415B. In some embodiments, such an impermeable member 410 having a plurality of fluid chambers 415 or fluid chamber portions can be constrained via external constraints and/or internal constraints that extend within one or more fluid chambers or portions, or between a plurality of fluid chambers or portions.

Constraints (e.g., external strapping) to limit the volumetric expansion of the fluid chamber 415 can be configured such that any peel welds (see e.g., FIGS. 14a, 15, 16a and 16b) never reach their failure state in peel. For example, in some embodiments, constraints can be configured such that the sections membrane material 740 on opposing sides of a peel weld are prevented from extending away from the weld no more than 45 degrees from each other at maximum inflation of the fluid chamber 415, which can be desirable to prevent failure of the peel welds. In further embodiments, constraints can be configured such that the section of membrane material 740 on opposing sides of a peel weld are prevented from extending away from the weld no more than 40, 35, 30, 25, 20, 15, 10 or 5 degrees from each other at maximum inflation of the fluid chamber 415. Such a maximum allowed angle can depend on the bond/weld strength, the strength of a coating bond with a fabric, the like. As discussed herein, such constraint can be desirable for single chamber or multi-chamber fluid chambers 415 (see, e.g., FIGS. 15, 16a and 16b).

In some embodiments, one or more piece of fluid-impermeable membrane material 740 may be used to reinforce bonds by overlapping bond sites, (e.g., creating a lap joint where one did not exist before or reinforcing a joint that was already there). Such overlapping membrane material 740 may also be used to smooth transitions in the fluid-impermeable member 410 that may be due to the creation of bonds or any other existing geometries or features of the fluid-impermeable member 410. In some examples, overlapping membrane material 740 may also serve to strengthen and/or stiffen sections of a fluid-impermeable member 410 by adding thickness or through the use of different membrane materials 740 with different strength and stiffness properties. In some examples, an overlapping membrane material 740 may assist with avoiding failure of the fluid-impermeable member 410 at high pressures, protect the fluid-impermeable member 410 from puncture, increase the life of the fluid-impermeable member 410 due to pressurization cycling, and the like.

A fluidic actuator 140 in some examples can comprise components such as one or more fluid-impermeable members 410 (e.g., defined at least in part by a membrane material 740), one or more interfaces 420, structural components and the like. Such components can be joined together utilizing various suitable methods including but not limited to one or more of heat welding, radio-frequency welding, adhesives, epoxies, mechanical bonds, mechanical fasteners, sewing, magnets, electromagnets, staples, and other joining methods such as clamping and any combination thereof.

Some embodiments can include strengthening or reinforcing a weld or bond (e.g., between portions of a fluid impermeable membrane material 740 or between an interface 420 and a fluid impermeable membrane material 740) by sewing stiches along the weld/bond (e.g., on the weld/bond, parallel to the weld/bond, or the like) and then reinforcing the stitches with more membrane material 740, adhesive or the like. Such a reinforcement in some examples can be desirable for re-establishing fluid impermeability due to the puncturing of the membrane material 740 that may have occurred during sewing.

One embodiment of a fluidic actuator 140 can include rigid interfaces 420 integrated with an airtight bladder (e.g., a bladder comprising a membrane material 740) such that the bladder would not be airtight without the rigid interfaces 420. In other words, some embodiments of a fluidic actuator 140 can comprise an impermeable member 410 and a fluid cavity 415 defined by a first and second interface 420 and a membrane material 740. Such an integration, in some examples, can be created such that all or nearly all bonding between the bladder and interfaces 420 and within the bladder itself are composed of shear welds, where upon inflation of the impermeable member 410 (e.g., an integrated bladder/interface system), materials at any bond experiences predominantly shear forces. One way to accomplish such shear-bonding in some examples is through the use of lap joints at some or all bonds between surfaces. This can make some embodiments of a fluidic actuator 140 optimal for reaching and operating at pressures relative to the surrounding atmosphere (referred to as gage pressure) greater than or equal to 5 psi, 10 psi, 20 psi, 30 psi, 50 psi, 75 psi, 100 psi, 150 psi, 200 psi, and the like over a number of cycles of inflation and deflation numbering greater than or equal to 10 cycles, 20 cycles, 30 cycles, 50 cycles, 75 cycles, 100 cycles, 1000 cycles, 5000 cycles, 10,000 cycles, 100,000 cycles, 1 million cycles and the like.

One embodiment of such a shear weld construction can include a fluid cavity created by a section of fluid impermeable membrane material 740 wrapped into a tube and welded to itself in a lap/shear weld, with a first and second interface 420 inserted into each end of the tube such that the fluid impermeable membrane material 740 overhangs the interfaces 420 on each end. This overhanging fluid impermeable material 740 can then be welded to the external faces of each interface 420 and/or to itself where folding of the fluid impermeable material 740 may be required, which can create the fluid impermeable member 410 and fluidic actuator 140 simultaneously. In one example embodiment, when the weld is made between the membrane material 740 and the edge or near the edge of the external face of the interface 420, such a weld can experience predominantly shear forces during inflation of the fluidic actuator 140.

For example, FIG. 20 illustrates an example embodiment of a fluidic actuator 140 comprising a first and second interface 420, where a membrane material 740 extends between the interfaces 420 and is coupled to an external face of the interfaces 420 via a bond or weld 750. In the example of FIG. 20, the membrane material is coupled to an external face of a lip 724 that defines an interface cavity 726; however, it should be clear that such a coupling is applicable to interfaces 420 of various suitable embodiments, including interfaces 420 having a flat external face, rounded external face, without an interface cavity 726, or the like.

Additionally, such a coupling on the external face of one or more interface 420 can contiguous (e.g., a contiguous circumferential weld 750 about the perimeter of the interface 420 proximate to an edge), or can comprise a plurality of separate couplings, which may or may not generate a fluid impermissible coupling. For example, such a coupling can comprise a plurality of spot welds, tacking of the membrane material 740 to the interface 420, or the like. Additionally, while examples such as FIGS. 20 and 7, 8, 13a-c and 18 illustrate bonds, couplings or welds 750 on either of the sidewalls or external face of the interfaces 420, it should be clear that various embodiments can comprise bonds, couplings or welds 750 on both of the sidewalls or external face of the interfaces 420, with one or both of such bonds, couplings or welds 750 defining a fluid impermissible coupling.

When one or more fluidic actuator 140 is used to actuate a body-worn exoskeleton 100 or exoskeleton system 200 (see e.g., FIGS. 1, 2 and 3), one embodiment of a fluidic actuator 140 comprises interfaces 140 that are integrated into the exoskeleton system 200, such that a fluid-impermeable membrane 740 can be connected to the interfaces 420 to form the fluidic actuator 140 and fluid-impermeable member 410 simultaneously. Another embodiment comprises interfaces 420 and fluid-impermeable membrane material 740 forming a fluidic actuator 140 which is then connected to the exoskeleton 100 or exoskeleton system 200.

In some embodiments, example designs, geometries, construction methods, and embodiments described herein allow for robust small fluidic actuators 140 capable of reaching and operating at pressures relative to the surrounding atmosphere (referred to as gage pressure) greater than or equal to 5 psi, 10 psi, 20 psi, 30 psi, 50 psi, 75 psi, 100 psi, 150 psi, 200 psi, and the like, without the fluidic actuator failing 140 (e.g., to failure of welds, a membrane material 740, or the like). Current industry methods are incapable of producing small high-pressure fluidic actuators, as may know actuators rely on peel welds throughout their construction which can be prone to failure at high pressures. The high power-to-weight ratio inherent in a small fluidic actuator 140 of various embodiments that is capable of reaching high-pressures, especially when the working fluid is a gas, can be advantageous in many powered applications, (e.g., body-worn exoskeletons 100 or exoskeleton systems), where in some examples it can be desirable to minimize distal mass.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, elements that are specifically shown in example embodiments should be construed to cover embodiments that comprise, consist essentially of, or consist of such elements, or such elements can be explicitly absent from further embodiments. Accordingly, the recitation of an element being present in one example should be construed to support some embodiments where such an element is explicitly absent.

What is claimed is:

1. A method of constructing an inflatable fluidic actuator, the method comprising:
   cutting a fluid-impermeable membrane material to a first shape, the fluid-impermeable membrane material comprising an inextensible and flexible sheet of woven fabric;
   folding the first shape of the fluid-impermeable membrane material into a tube configuration having a first tube end and a second tube end and an internal tube face and external tube face;
   coupling a first and second portion of the fluid-impermeable membrane material with a lap weld extending from the first tube end to the second tube end to fix the fluid-impermeable membrane material in the tube configuration;
   reinforcing the lap weld extending from the first tube end to the second tube end by sewing stiches along the lap weld;
   reinforcing and making the stiches fluid impermeable by applying one or more of an adhesive and additional fluid-impermeable membrane material to the stiches;
   coupling a first planar interface to the tube configuration at the first tube end by:
      inserting the first planar interface into the tube configuration at the first tube end with one or more first sidewalls of the first planar interface circumferentially engaging a first portion of the internal tube face at the first tube end, and
      coupling the first planar interface to the tube configuration at the first tube end by generating at least one of a first circumferential weld between the fluid-impermeable membrane material and the one or more first sidewalls and a first external face weld between fluid-impermeable membrane material at the first tube end onto a first external face of the first planar interface;
   coupling a second planar interface to the tube configuration at the second tube end by:

inserting the second planar interface into the tube configuration at the second tube end with one or more second sidewalls of the second planar interface circumferentially engaging a second portion of the internal tube face at the second tube end, and coupling the second planar interface to the tube configuration at the second tube end by generating at least one of a second circumferential weld between the fluid-impermeable membrane material and the one or more second sidewalls and a second external face weld between fluid-impermeable membrane material at the second tube end onto a second external face of the second planar interface;

applying one or more external constraint straps surrounding a length of the external tube face between the first and second tube ends, the one or more external constraint straps limiting lateral expansion of the tube configuration during inflation of the tube configuration; and applying one or more additional external constraint straps coupled to and extending between the first and second planar interfaces to create an unequal expansion of the tube configuration such that the unequal expansion results in the tube configuration forming an arc at least at a maximum inflation state of the tube configuration.

2. The method of claim 1, wherein the lap weld extending from the first tube end to the second tube end between the first and second portions of the fluid-impermeable membrane material is generated with at least one of heat, impulse and RF welding.

3. The method of claim 1, wherein the at least one of the first circumferential weld and first external face weld are generated with at least one of heat, impulse and RF welding and wherein the at least one of the second circumferential weld and second external face weld are generated with at least one of heat, impulse and RF welding.

4. The method of claim 1, wherein the first and second planar interfaces comprise at least one of a polycarbonate plastic and a thermoplastic polyurethane (TPU) plastic.

5. The method of claim 1, wherein the inextensible and flexible sheet of woven fabric comprises a thermoplastic polyurethane (TPU) coated fabric sheet.

6. A method of constructing an inflatable fluidic actuator, the method comprising:

cutting a fluid-impermeable membrane material to generate one or more shapes of fluid-impermeable membrane material;

generating a tube configuration with the one or more shapes of fluid-impermeable membrane material, the tube configuration having a first tube end and a second tube end and an internal tube face and external tube face;

coupling a first interface to the tube configuration at the first tube end by:

inserting the first interface into the tube configuration at the first tube end with one or more first sidewalls of the first interface circumferentially engaging a first portion of the internal tube face at the first tube end, and coupling the first interface to the tube configuration at the first tube end by generating at least one of:

a first circumferential bond between the fluid-impermeable membrane material and the one or more first sidewalls; and a first external face bond between fluid-impermeable membrane material at the first tube end onto a first external face of the first interface; and coupling a second interface to the tube configuration at the second tube end by:

inserting the second interface into the tube configuration at the second tube end with one or more second sidewalls of the second interface circumferentially engaging a second portion of the internal tube face at the second tube end, and coupling the second interface to the tube configuration at the second tube end by generating at least one of:

a second circumferential bond between the fluid-impermeable membrane material and the one or more second sidewalls; and a second external face bond between fluid-impermeable membrane material at the second tube end onto a second external face of the second interface.

7. The method of claim 6, wherein the fluid-impermeable membrane material comprises an inextensible and flexible sheet of woven fabric.

8. The method of claim 6, further comprising applying one or more external constraint straps surrounding a length of the external tube face between the first and second tube ends, the one or more external constraint straps limiting lateral expansion of the tube configuration during inflation of the tube configuration.

9. The method of claim 6, further comprising applying one or more external constraint straps coupled to and extending between the first and second interfaces the one or more external constraint straps limiting vertical expansion of the tube configuration during inflation of the tube configuration.

10. The method of claim 6, wherein generating the tube configuration comprises coupling a first and second portion of the fluid-impermeable membrane material with a lap weld extending from the first tube end to the second tube end to fix the fluid-impermeable membrane material in the tube configuration.

11. The method of claim 6, wherein generating the tube configuration with the one or more shapes of fluid-impermeable membrane material comprises welding portions of the one or more shapes together to generate the tube configuration via one or more welds.

12. The method of claim 11, further comprising reinforcing the one or more welds by sewing stiches along the one or more welds.

13. The method of claim 12, further comprising reinforcing and making the stiches fluid impermeable by applying one or more of an adhesive and additional fluid-impermeable membrane material to the stiches.

14. The method of claim 11, wherein the one or more welds comprise a plurality of peel welds coupling sections of fluid-impermeable membrane material on opposing sides of respective peel welds, and wherein the sections of fluid-impermeable membrane material on opposing sides of respective peel welds of the plurality of peel welds are prevented from extending away from each other no more than 45 degrees at a maximum inflation of the tube configuration.

15. A method of constructing an inflatable fluidic actuator, the method comprising:

generating a tube configuration with one or more shapes of fluid-impermeable membrane material, the tube configuration having a first tube end and a second tube end and an internal tube face and external tube face;

coupling a first interface to the tube configuration at the first tube end by:

coupling the first interface to the tube configuration at the first tube end by generating at least one of:
  a first circumferential bond between the fluid-impermeable membrane material and one or more first sidewalls of the first interface; and,
  a first external face bond between fluid-impermeable membrane material at the first tube end onto a first external face of the first interface; and
coupling a second interface to the tube configuration at the second tube end by:
  coupling the second interface to the tube configuration at the second tube end by generating at least one of:
    a second circumferential bond between the fluid-impermeable membrane material and one or more second sidewalls of the second interface, and
    a second external face bond between fluid-impermeable membrane material at the second tube end onto a second external face of the second interface.

16. The method of claim 15, wherein coupling the first interface to the tube configuration at the first tube end includes inserting the first interface into the tube configuration at the first tube end with one or more first sidewalls of the first interface circumferentially engaging a first portion of the internal tube face at the first tube end, and
wherein coupling the second interface to the tube configuration at the second tube end includes inserting the second interface into the tube configuration at the second tube end with one or more second sidewalls of the second interface circumferentially engaging a second portion of the internal tube face at the second tube end.

17. The method of claim 15, wherein the fluid-impermeable membrane material comprises an inextensible and flexible sheet.

18. The method of claim 15, further comprising applying one or more external constraints surrounding a length of the external tube face between the first and second tube ends, the one or more constraints limiting expansion of the tube configuration during inflation of the tube configuration.

19. The method of claim 15, wherein generating the tube configuration with the one or more shapes of fluid-impermeable membrane material comprises welding portions of the one or more shapes together to generate the tube configuration via one or more welds.

20. The method of claim 19, wherein the one or more welds comprise a plurality of peel welds coupling sections of fluid-impermeable membrane material on opposing sides of respective peel welds of the plurality of peel welds that are prevented from extending away from each other no more than 45 degrees when the tube configuration is at a maximum inflation state.

* * * * *